(12) United States Patent
Yaghi et al.

(10) Patent No.: US 7,662,746 B2
(45) Date of Patent: Feb. 16, 2010

(54) HIGH GAS ADSORPTION METAL-ORGANIC FRAMEWORK

(75) Inventors: Omar M. Yaghi, Los Angeles, CA (US); Banglin Chen, McAllen, TX (US)

(73) Assignee: The Regents of the University of Michigan, Ann Arbor, MI (US)

( * ) Notice: Subject to any disclaimer, the term of this patent is extended or adjusted under 35 U.S.C. 154(b) by 527 days.

(21) Appl. No.: 11/400,478

(22) Filed: Apr. 7, 2006

(65) Prior Publication Data

US 2006/0252641 A1 Nov. 9, 2006

Related U.S. Application Data

(60) Provisional application No. 60/699,141, filed on Apr. 7, 2005.

(51) Int. Cl.
*B01J 20/22* (2006.01)
(52) U.S. Cl. .................. 502/401; 502/439
(58) Field of Classification Search .............. 502/400, 502/401, 406, 414, 439
See application file for complete search history.

(56) References Cited

U.S. PATENT DOCUMENTS

| | | |
|---|---|---|
| 3,144,418 A | 8/1964 | Hill et al. |
| 4,359,327 A | 11/1982 | Armand et al. |
| 5,629,523 A | 5/1997 | Ngo et al. |
| 5,648,508 A | 7/1997 | Yaghi |
| RE35,908 E | 9/1998 | Kitaguchi et al. |
| 5,862,796 A | 1/1999 | Seki et al. |
| 5,880,471 A | 3/1999 | Schelten et al. |
| 5,940,460 A | 8/1999 | Seidel et al. |
| 6,072,181 A | 6/2000 | Hassard et al. |
| 6,312,902 B1 | 11/2001 | Shultz et al. |
| 6,348,607 B1 | 2/2002 | Müller et al. |
| 6,479,680 B1 | 11/2002 | Bassler et al. |
| 6,479,826 B1 | 11/2002 | Klann et al. |
| 6,518,441 B2 | 2/2003 | Grosch et al. |
| 6,545,281 B1 | 4/2003 | McGregor et al. |
| 6,617,467 B1 | 9/2003 | Mueller et al. |
| 6,624,318 B1 | 9/2003 | Mueller et al. |
| 6,727,371 B2 | 4/2004 | Muller et al. |
| 6,893,564 B2 | 5/2005 | Mueller et al. |
| 6,929,679 B2 | 8/2005 | Muller et al. |
| 6,930,193 B2 | 8/2005 | Yaghi et al. |
| 6,965,026 B2 | 11/2005 | Zaworotko et al. |
| 7,008,607 B2 | 3/2006 | Muller et al. |
| 7,119,219 B2 | 10/2006 | Muller et al. |
| 2003/0078311 A1 | 4/2003 | Muller et al. |
| 2004/0110950 A1 | 6/2004 | Li et al. |
| 2004/0225134 A1 | 11/2004 | Yaghi et al. |
| 2004/0265670 A1 | 12/2004 | Mueller et al. |

FOREIGN PATENT DOCUMENTS

| | | |
|---|---|---|
| CA | 2 387 122 | 2/2001 |
| CA | 2 414 756 | 1/2003 |
| CA | 2 414 779 | 1/2003 |
| DE | 44 08 772 | 9/1994 |
| DE | 197 23 950 | 12/1998 |
| DE | 198 35 907 | 2/2000 |
| DE | 198 47 629 | 4/2000 |
| DE | 199 36 547 | 2/2001 |
| DE | 100 15 246 | 10/2001 |
| DE | 100 32 884 | 1/2002 |
| DE | 100 32 885 | 1/2002 |
| DE | 101 11 230 | 9/2002 |
| DE | 101 43 195 | 3/2003 |
| EP | 00 557 116 | 8/1993 |
| EP | 0 727 608 | 8/1996 |
| EP | 0 790 253 | 8/1997 |
| EP | 1 280 090 A1 | 1/2003 |
| JP | 2004024247 | 1/2004 |
| WO | WO 97/46711 | 12/1997 |
| WO | WO 99/05151 | 2/1999 |
| WO | WO 00/78837 | 12/2000 |
| WO | WO 01/16209 | 3/2001 |
| WO | WO 01/27186 | 4/2001 |
| WO | WO 02/070526 | 9/2002 |
| WO | WO 02/088148 | 11/2002 |
| WO | WO 03/035717 | 5/2003 |
| WO | WO 03/044228 A1 | 5/2003 |

OTHER PUBLICATIONS

U.S. Appl. No. 10/270,642, filed Oct. 16, 2002, Mueller et al.
U.S. Appl. No. 10/611,863, filed Jul. 3, 2003, Mueller et al.
U.S. Appl. No. 10/983,629, filed Nov. 9, 2004, Hesse et al.
Bondi, A., "van der Waals Volumes and Radii," Journal of Phys. Chem., Mar. 16, 1964, vol. 68, No. 3, pp. 441-451.
Bennett, J.M. and J.V. Smith, "Positions of Cations and Molecules in Zeolites with the Faujastie-Type Framework I. Dehydrated Ca-Exchanged Faujasite," Mat. Res. Bull., vol. 3, No. 8, 1968, pp. 633-642.
Hoskins, B.F. and R. Robson, "Infinite Polymeric Frameworks Consisting of Three Dimensionally Linked Rod-Like Segments," J. Am. Chem. Soc., 1989, vol. 111, pp. 5962-5964.
Fagan, P.J. and M.D. Ward, "Building Molecular Crystals," Sci. Am., Jul. 1992, pp. 48-54.
Stein, A., S.W. Keller and T.E. Mallouk, "Turning Down the Heat, Design and Mechanism in Solid-State Synthesis," Mar. 12, 1993, vol. 259, pp. 1558-1564.
Russell, V.A., C.C. Evans, W.Li and M.D. Ward, "Nanoporous Molecular Sandwiches: Pillared Two-Dimensional Hydrogen-Bonded Networks with Adjustable Porosity," Science, Apr. 25, 1997, vol. 276, pp. 575-579.
Husing, N. and U. Schubert, "Aerogels-Airy Materials: Chemistry, Structure, and Properties," Agnew. Chem. Int. Ed., 1998, vol. 37, pp. 22-45.

(Continued)

*Primary Examiner*—Edward M Johnson
(74) *Attorney, Agent, or Firm*—Brooks Kushman P.C.

(57) ABSTRACT

A gas storage material contains a metal-organic framework that includes a plurality of metal clusters and a plurality of charged multidentate linking ligands that connect adjacent metal clusters. Each metal cluster includes one or more metal ions and at least one open metal site. The metal-organic framework includes one or more sites for storing molecular hydrogen. A hydrogen storage system using the hydrogen storage material is provided.

48 Claims, 5 Drawing Sheets

OTHER PUBLICATIONS

Menon, V.C. and S. Komarneni, "Porous Adsorbents for Vehicular Natural Gas Storage: A Review," J. of Porous Materials, 1998, vol. 5, pp. 43-58.

Jones, C.W., K. Tsuji and M.E. Davis, "Organic-Functionalized Molecular Sieves as Shape-Selective Catalysts," Nature, May 7, 1998, vol. 393, pp. 52-54.

Fujita, M., "Self-Assembly of [2]Catenanes Containing Metals in Their Backbones," Accounts of Chemical Research, 1999, vol. 32, No. 1, pp. 53-61.

Li, H., M. Eddaoudi, M. O'Keeffe and O.M. Yaghi, "Design and Synthesis of an Exceptionally Stable and Highly Porous Metal-Organic Framework," Nature, Nov. 18, 1999, vol. 402, pp. 276-279.

Li, H., C.E. Davis, T.L. Groy, D.G. Kelley and O.M. Yaghi, Coordinately Unsaturated Metal Centers in the Extended Porous Framework of $Zn_3(BDC)_3 \cdot 6CH_3OH$ (BDC=1,4-Benzenedicarboxylate), J. Am. Chem. Soc., 1998, vol. 120, pp. 2186-1287.

Kiang, Y.-H, G.B. Gardner, S. Lee, Z. Xu and E.B. Lobkovsky, "Variable Pore Size, Variable Chemical Functionality, and an Example of Reactivity Within Porous Phenylacetylene Silver Salts," J. Am. Chem. Soc., 1999, vol. 121, pp. 8204-8215.

Eddaoudi, M., H. Li and O.M. Yaghi, "Highly Porous and Stable Metal-Organic Frameworks: Structure Design and Sorption Properties," J. Am. Chem. Soc., 2000, vol. 122, pp. 1391-1397.

Noro, S., S. Kitagawa, M. Kondo and K. Seki, "A New, Methane Adsorbent, Porous Coordination Polymer $[\{CuSiF_6(4,4\text{-}bipyridine)_2\}_n]$," Angew. Chem. Int. Ed., 2000, vol. 39, No. 12, pp. 2081-2084.

Yaghi, O.M., M. O'Keeffe and M. Kanatzidis, "Design of Solids from Molecular Building Blocks: Golden Opportunities for Solid State Chemistry," J. Solid State Chem., 2000, vol. 152, pp. 1-2.

Reineke, T.M., M. Eddaoudi, D. Moler, M. O'Keeffe and O.M. Yaghi, "Large Free Volume in Maximally Interpenetrating Networks: The Role of Secondary Building Units Exemplified by $Tb_2(ADB)_3[CH_3)_2SO]_4 \cdot 16\,[(CH_3)_2SO]^1$," J. Am. Chem. Soc., 2000, vol. 122, pp. 4843-4844.

Eddaoudi, M., D.B. Moler, H. Li, B. Chen, T.M. Reineke, M. O'Keeffe and O.M. Yaghi, "Modular Chemistry: Secondary Building Units as a Basis for the Design of Highly Porous and Robust Metal-Organic Carboxylate Frameworks," Acc. Chem. Res., 2001, vol. 34, pp. 319-330.

Seki, K., "Design of an Adsorbent with an Ideal Pore Structure for Methane Adsorption Using Metal Complexes," Chem. Commun., 2001, 1496-1497.

Kim, J., B. Chen, T.M. Reineke, H. Li, M. Eddaoudi, D.B. Moler, M. O'Keeffe and O.M. Yaghi, "Assembly of Metal-Organic Frameworks from Large Organic and Inorganic Secondary Building Units: New Examples and Simplifying Principles for Complex Structures," J. Am. Chem. Soc., 2001, vol. 123, pp. 8239-8274.

Guillou, N., Q. Gao, P.M. Forster, J. Chang, M. Norgues, S. Park, G. Ferey and A.K. Cheetham, "Nickel(ii) Phosphate VSB-5: A Magnetic Nanoporous Hydrogenation Catalyst with 24-Ring Tunnels," Angew. Chem. Int. Ed., 2001, vol. 40, No. 15, pp. 2831-2834.

Naumov, P., G. Jovanovski, M. Ristova, I.A. Razak, S. Cakir, S. Chantrapromma, H. Fun and S. Weng Ng, "Coordination of Deprotonated Saccharin in Copper(II) Complexes. Structural Role of the Saccharinate Directed by the Ancillary N-heterocyclic Ligands," Z. Anorg. Allg. Chem., 2002, vol. 628, pp. 2930-2939.

Wallner, H. and K. Gatterer, "Growth of Pure $Ni(OH)_2$ Single Crystals from Solution—Control of the Crystal Size," Z. Anorg. Allg. Chem., 2002, vol. 628, pp. 2818-2820.

Patoux, S. and C. Masquelier, "Lithium Insertion into Titanium Phosphates, Silicates and Sulfates," Chemistry of Materials, 2002, vol. 14, No. 12, pp. 5057-5068.

Rosi, N., M. Eddaoudi, J. Kim et al., "Infinite Secondary Building Units & Forbidden Catenation in Metal-Organic Frameworks", Angew. Chem. Int. Ed., 2002, 41, No. 2, pp. 284-285.

Eddaoudi, M., J. Kim, N. Rosi et al., "Systematic Design of Pore Size & Functionality in Isoreticular MOFs & Their Application in Methane Storage", Science, vol. 295, Jan. 18, 2002, pp. 469-472.

Seki, K., "Surface Area Evaluation of Coordination Polymers Having Rectangular Micropores", Langmuir 2002, 18, pp. 2441-2443.

Seki, K. and W. Mori, "Syntheses & Characterization of Microporous Coordination Polymers with Open Frameworks", J. Phys. Chem. B, 2002, 106, pp. 1380-1385.

Rosi, N. L., J. Eckert, M. Eddaoudi et al., "Hydrogen storage in Microporous Metal-Organic Frameworks", Science, vol. 300, May 16, 2003, pp. 1127-1129.

Yaghi, O.M., M. O'Keeffe, N.W. Ockwig et al., "Reticular Synthesis and the Design of New Materials", Nature, vol. 423, Jun. 2003, pp. 705-714.

McGregor, Douglas S. et al., "Semi-Insulating Bulk GaAs Thermal Neutron Imaging Arrays," IEEE Transactions on Nuclear Science, vol. 43, No. 3, Jun. 1996, pp. 1357-1364.

Rose, A., "Sputtered Boron Films on Silicon Surface Barrier Detectors," Nuclear Instruments and Methods, 52, 1967, pp. 166-170.

Feigl, B. et al., "Der Gd-Neutronenzahler," Nuclear Instruments and Methods, 61, Wien, Austria, 1968, pp. 349-356.

Mireshghi, A. et al., "High Efficiency Neutron Sensitive Amorphous Silicon Pixel Detectors," IEEE Transactions on Nuclear Science, vol. 41, No. 4, Aug. 1994, pp. 915-921.

Foulon, F. et al., "Neutron Detectors Made From Chemically Vapour Deposited Semiconductors," Proc. MRS, 487, 1998, pp. 591-596.

Dulloo, A.R. et al., "Radiation Response Testing of Silicon Carbide Semiconductor Neutron Detectors For Monitoring Thermal Neutron Flux," Report 97-9TK1-NUSIC-R1, Westinghouse STC, Pittsburgh, PA, Nov. 18, 1997, pp. 6-1-6-14.

Knoll, Glenn F., Radiation Detection and Measurement, 3rd Ed. John Wiley & Sons, Inc., New York, 2000, Chapter 14, pp. 505-508.

Garber, D.I. et al., "Neutron Cross Sections," 3rd Edition, vol. 11, Curves, Brookhaven National Laboratory, Upton, Jan. 1976, pp. 11-13 & pp. 23-24.

McLane, Victoria et al., "Neutron Cross Sections," vol. 2, Neutron Cross Section Curves, Academic Press, San Diego, CA, 1988, pp. 12-13 & pp. 26-27.

McGregor, Douglas, S. et al., "Thin-Film-Coated Bulk GaAs Detectors for Thermal and Fast Neutron Measurements," Nuclear Instruments and Methods in Physics Research A 466, 2001, pp. 126-141.

McGregor, Douglas, S. et al., "Design Considerations for Thin Film Coated Semiconductor Thermal Neutron Detectors—I: Basics Regarding Alpha Particle Emitting Neutron Reactive Films," Nuclear Instruments & Methods, A 500, 2003, pp. 272-308.

Puckett, P.R. et al., "Thin Film Processes II," Chapter V-2, J.L. Vossen and W. Kern, Eds., Academic Press, Boston, 1991, pp. 749, 768-770.

Szem S.M., "VLSI Technology," McGraw-Hill, New York, 1983.

Ruska, W.S., "Microelectronic Processing," McGraw-Hill, New York, 1987.

McGregor, Douglas, S. et al., "Self-Biased Boron-10 Coated High-Purity Epitaxial GaAs Thermal Neutron Detectors," IEEE Transactions on Nuclear Science, vol. 47, No. 4, Aug. 2000, pp. 1364-1370.

Klann, Raymond T. et al., "Development of Coated Gallium Arsenide Neutron Detectors," Conference Record of ICONE-8, 8TH International Conf. on Nuclear Eng., Apr. 2-6, 2000, Baltimore, MD, pp. 1-6.

McGregor, Douglas, S. et al., "New Surface Morphology for Low Stress Thin-Film-Coated Thermal Neutron Detectors," IEE Transactions on Nuclear Science, vol. 49, No. 4, Aug. 2002, pp. 1999-2004.

http://www.mems-exchange.org/.

http://physics.nist.gov/MajResProj/rfcell/drawings.html.

Schelten, J. et al., "A New Neutron Detector Development Based on Silicon Semiconductor and LiF Converter," Physica B 234-236, 1997, pp. 1084-1086.

Atomnaya Energiya, Soviet Atomic energy, Russian Original, vol. 62, No. 4, Apr. 1987, pp. 316-319.

Allier, C.P., "Micromachined Si-Well Scintillator Pixel Detectors," Chapter 8, 2001, pp. 122-134.

McGregor, Douglas S. et al., "Bulk GaAs-Based Neutron Detectors For Spent Fuel Analysis," Proceedings of ICONE 8, 8th Int'l Conf. on Nuclear Eng., Baltimore, MD, Apr. 2-6, 2000, pp. 1-5.

De Lurgio, Patrick M. et al., "A Neutron Detector To Monitor The Intensity of Transmitted Neutrons For Small-Angle Neutron Scattering Instruments," Elsevier Science B.V., Nuclear Instruments And Methods in Physics Research A 505, 2003, pp. 46-49.

Klann, Raymond T. et al., "Development of Semiconductor Detectors For Fast Neutron Radiography," 15th Int'l. conf. on Applications of Accelerators in Research and Industry, Nov. 2000, pp. 1-4.

Gersch, H.K. et al., "The Effect of Incremental Gamma-Ray Doses and Incremental Neutron Fluences Upon The Performance of Self-Biased 10B-Coated High-Purity Epitaxial GaAs Thermal Neutron Detectors," Nuclear Instruments and Methods in Physics Research A 489, Feb. 12, 2002, pp. 85-98.

McGregor, Douglas S. et al., "Thin-Film-Coated Detectors For Neutron Detection," J. of Korean Assoc. For Radiation Protection, vol. 26, 2001, pp. 167-175.

McGregor, Douglas, S. et al., "Designs For Thin-Film-Coated Semiconductor Thermal Neutron Detectors," University of Michigan, Ann Arbor, Michigan, Nov. 14, 2001, pp. 1-6.

McGregor, Douglas S. et al., "Recent Results From Thin-Film-Coated Semiconductor Neutron Detectors," Proceedings of SPIE, vol. 4784, 2002, pp. 164-182.

Chae et al., "A route to high surface area, porosity and inclusion of large molecules in crystals," Nature, 2004, vol. 427, pp. 523-527.

Eddaoudi, M., J. Kim, J.B. Wachter et al., "Porous Metal-Organic Polyhedra: 25Å Cuboctahedron Constructed from 12 $Cu_2$ $(CO_2)_4$ Paddle-Wheel Building Blocks," J. Am. Chem. Soc., 2001, 123, pp. 4368-4369.

Biradha, K., Y. Hongo & M. Fujita, "Open Square-Grid Coordination Polymers of the Dimension 20×20 Å: Remarkably Stable & Crystalline Solids Even After Guest Removal," Angew. Chem. Int. Ed., 2000, 39, No. 21, pp. 3843-3845.

Li, Hailian, C.E. Davis, T.L. Groy, D.G. Kelley, O.M. Yaghi, "Coordinatively Unsaturated Metal Centers in the Extended Porous Framework of $Zn_3(BDC)_3 \cdot 6CH_3OH$ (BDC=1,4-Benzenedicarboxylate)," J. Am. Chem. Soc. 1998, 120, pp. 2186-2187.

Yaghi, O.M., G. Li, H. Li, "Selective binding and removal of guests in a microporous metal-organic framework," Nature, vol. 378(6558), Dec. 14, 1996, pp. 703-706.

Yaghi, O.M., C.E. Davis, G. Li, and H. Li, "Selective Guest Binding by Tailored Channels in a 3-D Porous Zinc(II)-Benzenetricarboxylate Network," J. Am. Chem. Soc. 1997, 199, pp. 2861-2868.

Yaghi, O.M., H. Li, "Hydrothermal Synthesis of a Metal-Organic Framework Containing Large Rectangular Channels," J. Am. Chem. Soc. 1995, 117, pp. 10401-10402.

Yaghi, O.M., H. Li, C. Davis, D. Richardson and T.L. Groy, "Synthetic Strategies, Structure Patterns, and Emerging Properties in the Chemistry of Modular Porous Solids," Acc. Chem. Res. 1998, 31, pp. 474-484.

Li, H., M. Eddaoudi, D.A. Richardson and O.M. Yaghi, Porous Germanates: Synthesis, Structure, and Inclusion Properties of $Ge_7O_{14.5}F_2 \cdot [(CH_3)_2NH_2]_3(H_2O)_{0.86}$, J. Am. Chem. Soc., 1998, 120, pp. 8567-8568.

Li, H., M. Eddaoudi, T.L. Groy and O.M. Yaghi, Establishing Microporosity in Open Metal—Organic Frameworks: Gas Sorption Isotherms for Zn(BDC)(BDC=1,4-Benzenedicarboxylate), J. Am Chem. Soc. 1998, 120, pp. 8571-8572.

Li, H. and O.M. Yaghi, "Transformation of Germanium Dioxide to Microporous Germanate 4-Connected Nets," J. Am Chem. Soc. 1998, 120, pp. 10569-10570.

Reineke, T.M., M. Eddaoudi, M. Fehr, D. Kelley and O.M. Yaghi, "From Condensed Lanthanide Coordination Solids to Microporous Frameworks Having Accessible Metal Sites," J. Am. Chem. Soc. 1999, 121, pp. 1651-1657.

Li, H., M. Eddaoudi and O.M. Yaghi, "An Open-Framework Germanate with Polycubane-Like Topology," Angew. Chem. Int. Ed. 1999, 38, No. 5, pp. 653-655.

Reineke, T.M., M. Eddaoudi, M. O'Keeffe and O.M. Yaghi, "A Microporous Lanthanide—Organic Framework," Angew. Chem. Int. Ed. 1999, 38, No. 17, pp. 2590-2594.

Chen, B., M. Eddaoudi, T.M. Reineke, J.W. Kampf, M. O'Keeffe and O.M. Yaghi, $Cu_2(ATC) \cdot 6H_2O$: Design of Open Metal Sites in Porous Metal-Organic Crystals (ATC: 1,3,5,7-Adamantane Tetracarboxylate), J. Am. Chem. Soc. 2000, 122, pp. 11559-11560.

Chae, H.K., M. Eddaoudi, J. Kim, S.I. Hauck, J.F. Hartwig, M. O'Keeffe and O.M. Yaghi, "Tertiary Building Units: Synthesis, Structure, and Porosity of a Metal-Organic Dendrimer Framework (MODF-1)," J. Am. Chem. Soc. 2001, 123, pp. 11482-11483.

Braun, M.E., C.D. Steffek, J. Kim, P.G. Rasmussen and O.M. Yaghi, "1,4-Benzenedicarboxylate derivatives as links in the design of paddle-wheel units and metal-organic frameworks," Chem. Commun., 2001, pp. 2532-2533.

Barton, T.J., L.M. Bull, W.G. Klemperer, D.A. Loy, B. McEnaney, M. Misono, P.A. Monson, G. Pez, G.W. Scherer, J.C. Vartuli and O.M. Yaghi, "Tailored Porous Materials," Chem. Mater. 1999, 11, pp. 2633-2656.

Eddaoudi, M., J. Kim, M. O'Keeffe and O.M. Yaghi, "$Cu_2[o-Br-C_6H_3(CO_2)_2]_2$ $(H_2O)_2 \cdot (DMF)_8(H_2O)_2$: A Framework Deliberately Designed To Have the NbO Structure Type," J. Am. Chem. Soc., 2002, vol. 124, No. 3, pp. 376-377.

Rosi, N.L., M. Eddaoudi, J. Kim, M. O'Keeffe and O.M. Yaghi, "Advances in the chemistry of metal-organic frameworks," CrystEngComm, 2002, 4(68), pp. 401-404.

Plevert, J., R. Sanchez-Smith, T.M. Gentz, H. Li, T.L. Groy, O.M. Yaghi and M. O'Keeffe, "Synthesis and Characterization of Zirconogermanates," Inorganic Chemistry, vol. 42, No. 19, 2003, pp. 5954-5959.

Vodak, D.T., K. Kim, L. Iordanidis, P.G. Rasmussen, A.J. Matzger and O.M. Yaghi, "Computation of Aromatic $C_3N_4$ Networks and Synthesis of the Molecular Precursor $N(C_3N_3)_3Cl_6$," Chem. Eur. J. 2003, 9, pp. 4197-4201.

Olaf Delgado Friedrichs, Michael O'Keeffe and Omar M. Yaghi, "Three-periodic nets and tilings: regular and quasiregular nets," Acat Cryst., 2003, A59, pp. 22-27.

Olaf Delgado Friedrichs, Michael O'Keeffe and Omar M. Yaghi, "Three-periodic nets and tilings: semiregular nets," Acat Cryst., 2003, A59, pp. 515-525.

Hailian Li, Jaheon Kim, Michael O'Keeffe and Omar M. Yaghi, "$[Cd_{16}In_{64}S_{134}]^{44-}$: 31-Å Tetrahedron with a Large Cavity," Angew. Chem. Int. Ed., 2003, 42, pp. 1819-1821.

Chae, H.K., J. Kim, O.D. Friedrichs, M. O'Keeffe and O.M. Yaghi, "Design of Frameworks with Mixed Triangular and Octahedral Building Blocks Exemplified by the Structure of $[Zn_4O(TCA)_2]$ Having the Pyrite Topology," Angew. Chem. Int. Ed, 2003, 42, pp. 3907-3909.

Plevert, J., T.M. Gentz, T.L. Groy, M. O'Keeffe and O.M. Yaghi, "Layered Structures Constructed from New Linkages of $Ge_7(O,OH,F)19$ Clusters," Chem. Mater., 2003, 15, pp. 714-718.

Duren, T., L. Sarkisov, O.M. Yaghi and R.Q. Snurr, "Design of New Materials for Methane Storage," Langmuir, 2004, 20, pp. 2683-2689.

Rowsell, J.L.C., A.R. Millward, K.S. Park and O.M. Yaghi, "Hydrogen Sorption in Functionalized Metal-Organic Frameworks," J. Am. Chem. Soc., 2004, 126, pp. 5666-5667.

Rowsell, J.L.C., O.M. Yaghi, "Metal-organic frameworks: a new class of porous materials," Microporous and Mesoporous Materials 73 (2004), pp. 3-14.

Rosi, N.L., J. Kim, M. Eddaoudi, B. Chen, M. O'Keeffe and O.M. Yaghi, "Rod Packings and Metal-Organic Frameworks Constructed from Rod-Shaped Secondary Building Units," J. Am. Chem. Soc., 2005, 127, pp. 1504-1518.

Chen, B., N.W. Ockwig, F.R. Fronczek, D.S. Contreras and O.M. Yaghi, "Transformation of a Metal-Organic Framework from the NbO to PtS Net," Inorganic Chemistry, vol. 44, No. 2, 2005, pp. 181-183.

HIGH GAS ADSORPTION METAL-ORGANIC FRAMEWORK

CROSS-REFERENCE TO RELATED APPLICATIONS

This application claims the benefit of U.S. Provisional Application Ser. No. 60/669,141 filed Apr. 7, 2005.

BACKGROUND OF THE INVENTION

1. Field of the Invention

The present invention relates generally to materials that are used to store gas molecules, and specifically to materials that store molecular hydrogen by adsorption or absorption.

2. Background Art

Metal-organic frameworks ("MOFs") are a rapidly growing class of porous materials for their amenability to design and extraordinary porosity. The recent discovery that MOFs take up significant amounts of hydrogen has further intensified research in this area. In particular, the focus remains on identifying strategies for designing MOF structures that would be capable of high hydrogen storage capacity. Metal-oxide units and the organic linkers have been identified as important features for hydrogen binding. More recently, it has been shown that interpenetrating MOFs take up more hydrogen than their non-interpenetrating analogues.

The synthetic conditions that produce $Cu_2(CO_2)_4$ "paddle-wheel" units in metal-organic frameworks ("MOFs"), and the use of these materials in the design of 0-periodic discrete and 3-periodic extended structures are known. MOF-505 is synthesized using analogous conditions: the solvothermal reaction of 3, 3', 5, 5'-biphenyltetracarboxylic acid ("$H_4BPTC$") (25 mg, 0.076 mmol) and $Cu(NO_3)_2.(H_2O)_2.5$ (52 mg, 0.22 mmol) in N,N-dimethylformamide (DMF)/ethanol/$H_2O$ (3:3:2 ml) at 65° C. for 24 hrs gave green block shaped crystals (47 mg, 86% yield based on $H_4BPTC$). The resulting compound was found to be consistent with a formula of $Cu_2(BPTC)(H_2O)_2.(DMF)_3(H_2O)$ by elemental microanalysis and single-crystal X-ray diffraction studies.

Currently, there is much interest in developing methodology and systems for storing hydrogen for a variety of applications. For example, hydrogen is an important fuel for fuel cells which generate electricity by the electrochemical oxidation of hydrogen. Moreover, hydrogen as a combustion fuel is very environmentally friendly, generating only water as a combustion byproduct. Hydrogen storage for such applications is complicated by the fact that molecular hydrogen gas is flammable and in some situations explosive. Alternative methodology for storing hydrogen exist, but each of the current alternatives are undesirable for one or more reasons.

Carbon dioxide removal is another current area of significant interest. Removal of carbon dioxide from the flue exhaust of power plants, currently a major source of anthropogenic carbon dioxide, is commonly accomplished by chilling and pressurizing the exhaust or by passing the fumes through a fluidized bed of aqueous amine solution, both of which are costly and inefficient. Other methods based on chemisorption of carbon dioxide on oxide surfaces or adsorption within porous silicates, carbon, and membranes have been pursued as means for carbon dioxide uptake. However, in order for an effective adsorption medium to have long term viability in carbon dioxide removal it should combine two features: (i) a periodic structure for which carbon dioxide uptake and release is fully reversible, and (ii) a flexibility with which chemical functionalization and molecular level fine-tuning can be achieved for optimized uptake capacities.

Accordingly, there is a need for material with high molecular hydrogen storage capacity.

SUMMARY OF THE INVENTION

The present invention solves one or more problems of the prior art by providing in one embodiment a hydrogen storage material comprising a metal-organic framework. The metal-organic framework of the present embodiment includes a plurality of metal clusters and a plurality of charged multidentate linking ligands that connect adjacent metal clusters. Each metal cluster includes one or more metal ions and at least one open metal site. Advantageously, the metal-organic framework includes one or more sites for storing molecular hydrogen.

In another embodiment of the present invention, a gas storage material comprising a metal-organic framework is provided. The metal-organic framework of the present embodiment includes a plurality of metal clusters and a plurality of charged multidentate linking ligands that connect adjacent metal clusters. Each metal cluster includes one or more metal ions and at least one accessible metal site. Advantageously, the metal-organic framework includes one or more sites for storing gas molecules.

In yet another embodiment of the present invention, a method of forming the gas storage material set forth above is provided. The metal-organic framework is formed by combining a solution comprising a solvent and metal ions selected from the group consisting of Group 1 through 16 metals including actinides, and lanthanides, and combinations thereof with a multidentate linking ligand to form a precursor metal-organic framework. The precursor metal-organic framework is activated by removing one or more ligands to expose one or more open metal sites.

In still another embodiment of the present invention, a gas storage system is provided. The gas storage system of this embodiment utilizes the gas storage material set forth above. In a variation, the gas storage system is configured to separate a target gas from a gaseous mixture.

DETAILED DESCRIPTION OF THE PREFERRED EMBODIMENT(S)

Figure 1A:
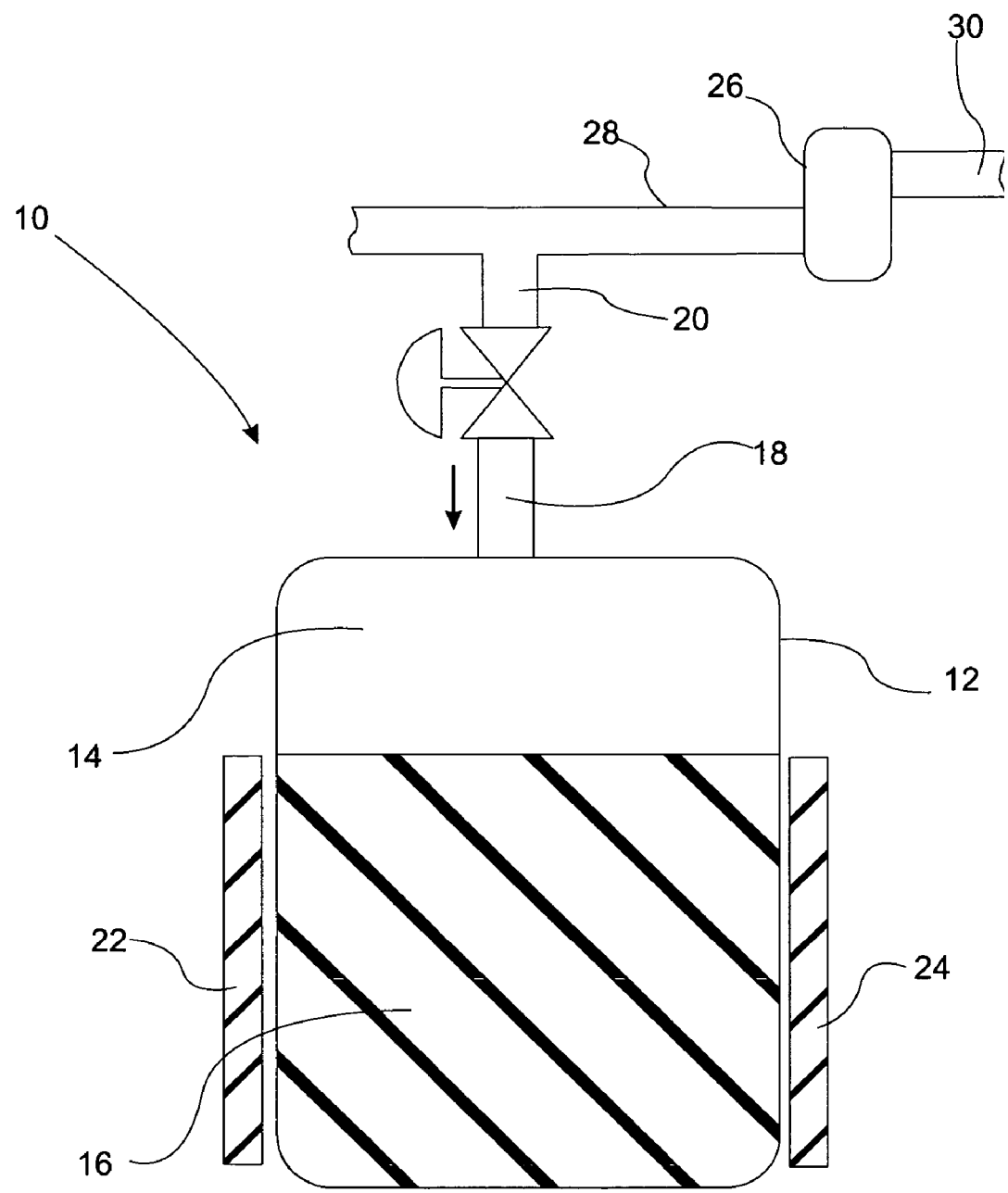
FIG. 1A is a schematic illustration of a gas storage system using the gas storage material of at least one embodiment of the present invention.

Reference will now be made in detail to presently preferred compositions or embodiments and methods of the invention, which constitute the best modes of practicing the invention presently known to the inventors.

As used herein "linking ligand" means a chemical species (including neutral molecules and ions) that coordinate two or more metals resulting in an increase in their separation, and the definition of void regions or channels in the framework that is produced. Examples include 4,4'-bipyridine (a neutral, multiple N-donor molecule) and benzene-1,4-dicarboxylate (a polycarboxylate anion).

As used herein "non-linking ligand" means a chemical species that is coordinated to a metal but does not act as a linker.

As used herein "guest" means any chemical species that resides within the void regions of an open framework solid that is not considered integral to the framework. Examples include: molecules of the solvent that fill the void regions during the synthetic process, other molecules that are exchanged for the solvent such as during immersion (via diffusion) or after evacuation of the solvent molecules, such as gases in a sorption experiment.

As used herein "charge-balancing species" means a charged guest species that balances the charge of the framework. Quite often this species is strongly bound to the framework, i.e. via hydrogen bonds. It may decompose upon evacuation to leave a smaller charged species (see below), or be exchanged for an equivalently charged species, but typically it cannot be removed from the pore of a metal-organic framework without collapse.

As used herein "space-filling agent" means a guest species that fills the void regions of an open framework during synthesis. Materials that exhibit permanent porosity remain intact after removal of the space-filling agent via heating and/or evacuation. Examples include: solvent molecules or molecular charge-balancing species. The latter may decompose upon heating, such that their gaseous products are easily evacuated and a smaller charge-balancing species remain in the pore (i.e. protons). Sometimes space filling agents are referred to as templating agents.

As used herein "accessible metal site" means a site in a metal cluster and, in particular, a position adjacent to a metal in a metal cluster available for a chemical moiety such as a ligand to attach.

As used herein "open metal site" means a site in a metal cluster and, in particular, a position adjacent to a metal in a metal cluster from which a ligand or other chemical moiety has been removed, rendering that metal cluster reactive for adsorption of a chemical species having available electron density for attachment to the metal cluster and, in particular, a metal in the metal cluster.

As used herein "metal cluster" means any metal containing moiety present in a metal-organic framework. This definition embracing single metal atoms or metal ions to groups of metals or metal ions that optionally include ligands or covalently bonded groups.

In one embodiment of the present invention, a gas storage material comprising a metal-organic framework is provided. The metal-organic framework of the present embodiment includes a plurality of metal clusters and a plurality of charged multidentate linking ligands that connect adjacent metal clusters. Each metal cluster includes one or more metal ions and at least one open metal site. Advantageously, the metal-organic framework includes one or more sites for storing gas molecules. In this embodiment, the one or more sites include the at least one open metal site. Gases that may be stored in the gas storage material of the invention include gas molecules comprising available electron density for attachment to the one or more sites for storing gas. Such electron density includes molecules having multiple bonds between two atoms contained therein or molecules having a lone pair of electrons. Suitable examples of such gases include, but are not limited to, the gases comprising a component selected from the group consisting of ammonia, argon, carbon dioxide, carbon monoxide, hydrogen, and combinations thereof. In a particularly useful variation of the present embodiment, the gas storage material is a hydrogen storage material that is used to store hydrogen ($H_2$). In another particularly useful variation, the gas storage material is a carbon dioxide storage material that may be used to separate carbon dioxide from a gaseous mixture.

In a variation of this embodiment, the open metal site is formed by activating a precursor metal-organic framework. In a refinement, this activation involves removing one or more chemical moieties from the metal cluster. Typically, such moieties are ligands complexed to or bonded to a metal or metal ion within the metal clusters. Moreover, such moieties include species such as water, solvent molecules contained within the metal clusters, and other chemical moieties having electron density available for attachment to the metal cluster and/or metal atoms or ions contained therein. Such electron density includes molecules having multiple bonds between two atoms contained therein or molecules having a lone pair of electrons.

In another embodiment of the present invention, a gas storage material comprising a metal-organic framework is provided. The metal-organic framework of the present embodiment includes a plurality of metal clusters and a plurality of charged multidentate linking ligands that connect adjacent metal clusters. Each metal cluster includes one or more metal ions and at least one accessible metal site. Advantageously, the metal-organic framework includes one or more sites for storing gas molecules. In this embodiment, the one or more sites include the at least one accessible metal site. Gases that may be stored in the gas storage material of the invention include gas molecules comprising available electron density for attachment to the one or more sites for storing gas. Suitable examples of such gases include, but are not limited to, the gases comprising a component selected from the group consisting of ammonia, argon, carbon dioxide, carbon monoxide, hydrogen, and combinations thereof. In one variation of this embodiment, the accessible metal site is an open metal site.

The metal-organic frameworks used in the embodiments of the invention include a plurality of pores for gas adsorption. In one variation, the plurality of pores has a unimodal size distribution. In another variation, the plurality of pores have a multimodal (e.g., bimodal) size distribution.

In another variation of the embodiments of the gas storage materials set forth above, the metal organic frameworks include metal clusters comprising one or more metal ions. In another variation, the metal-organic frameworks include metal clusters that comprise two or more metal ions. In still another variation, the metal-organic frameworks include metal clusters that comprise three or more metal ions. The metal ion may be selected from the group consisting of Group 1 through 16 metals of the IUPAC Periodic Table of the Elements including actinides, and lanthanides, and combinations thereof. Examples of suitable metal ions include $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, $Bi^+$, and combinations thereof.

In still another variation of the gas storage materials set forth above, the metal cluster has formula $M_mX_n$ where M is metal ion, X is selected from the group consisting of a Group 14 through Group 17 anion, m is an integer from 1 to 10, and n is a number selected to charge balance the metal cluster so that the metal cluster has a predetermined electric charge. In a further refinement, X is selected from the group consisting of O, N, and S. In another refinement, M is selected from the group consisting of $Mg^{2+}$, $Ca^{2+}$, $Sr^{2+}$, $Ba^{2+}$, $V^{2+}$, $V^{3+}$, $V^{4+}$, $V^{5+}$, $Mn^{2+}$, $Re^{2+}$, $Fe^{2+}$, $Fe^{3+}$, $Ru^{3+}$, $Ru^{2+}$, $Os^{2+}$, $Co^{2+}$, $Rh^{2+}$, $Ir^{2+}$, $Ni^{2+}$, $Pd^{2+}$, $Pt^{2+}$, $Cu^{2+}$, $Zn^{2+}$, $Cd^{2+}$, $Hg^{2+}$, $Si^{2+}$, $Ge^{2+}$, $Sn^{2+}$, and $Pb^{2+}$.

In still another variation of the gas storage materials set forth above, the multidentate ligand has 6 or more atoms incorporated into aromatic rings. In other variations, the multidentate ligand has 12 or more atoms incorporated in aromatic rings. In yet another variation, the multidentate ligand has 16 or more atoms incorporated into aromatic rings. Examples of useful multidentate ligands include the ligands having formulae 1 through 20:

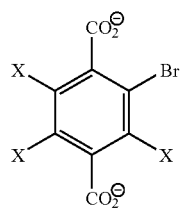

1

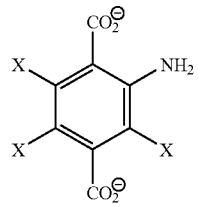

2

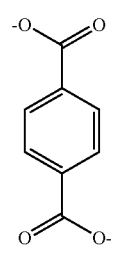

3

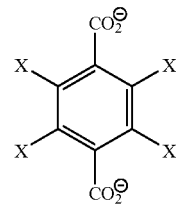

4

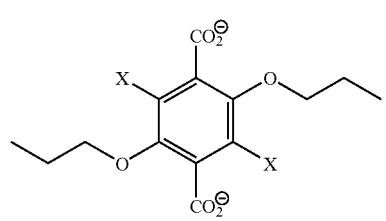

5

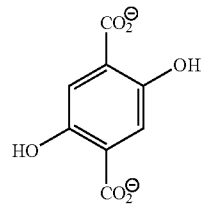

6

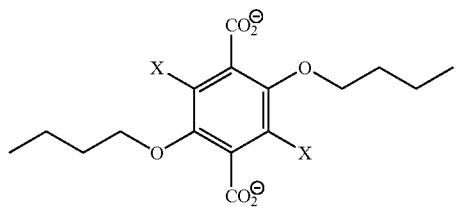

7

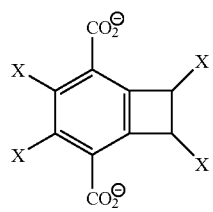

8

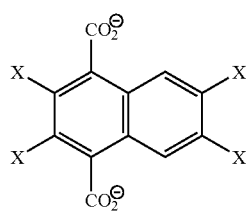

9

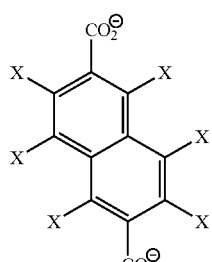

10

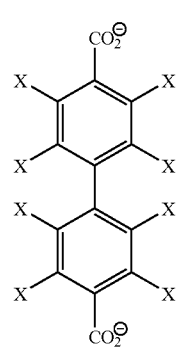

11

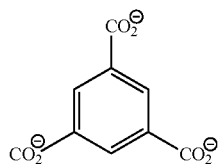
12
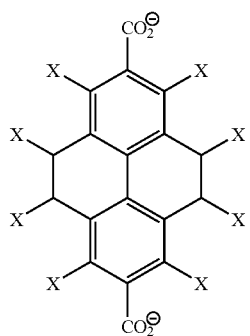
13
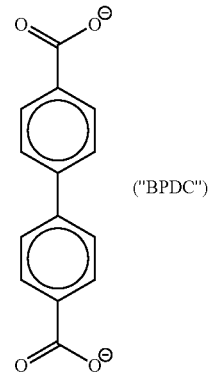
("BPDC")
14
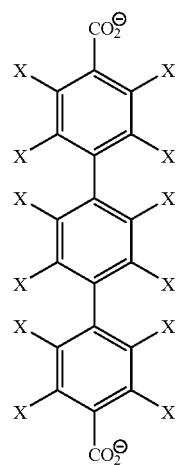
15
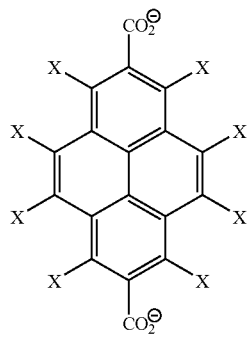
16
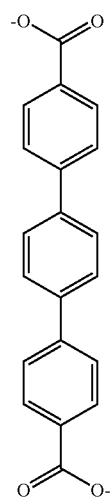
17
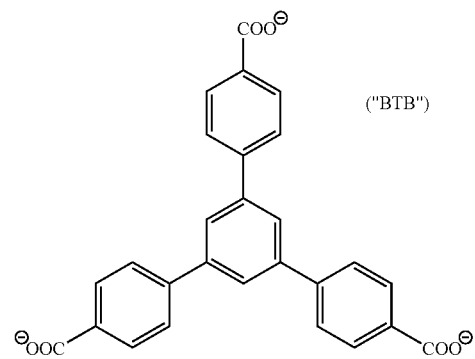
("BTB")
18
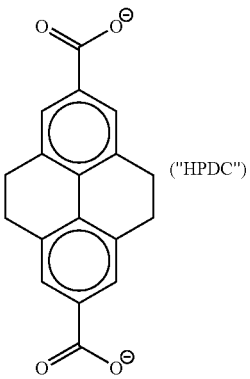
("HPDC")
19

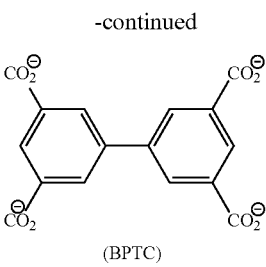

(BPTC)

wherein X is hydrogen, —NHR, —N(R)$_2$, halides, C$_{1-10}$ alkyl, C$_{6-18}$ aryl, or C$_{6-18}$ aralky, —NH$_2$, alkenyl, alkynyl, —Oalkyl, —NH(aryl), cycloalkyl, cycloalkenyl, cycloalkynyl, —(CO)R, —(SO$_2$)R, —(CO$_2$)R —SH, —S(alkyl), —SO$_3$H, —SO$^{3-}$M$^+$, —COOH, —COO$^-$M$^+$, —PO$_3$H$_2$, —PO$_3$H$^-$M$^+$, —PO$_3{}^{2-}$M$^{2+}$, or —PO$_3{}^{2-}$M$^{2+}$, —NO$_2$, —CO$_2$H, silyl derivatives; borane derivatives; and ferrocenes and other metallocenes; M is a metal atom, and R is C$_{1-10}$ alkyl.

The metal-organic framework used in the present invention optionally further comprises a non-linking ligand. In a variation, the non-linking ligand is selected from the group consisting of O$^{2-}$, sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, sulfide, hydrogen sulphate, selenide, selenate, hydrogen selenate, telluride, tellurate, hydrogen tellurate, nitride, phosphide, arsenide, arsenate, hydrogen arsenate, dihydrogen arsenate, antimonide, antimonate, hydrogen antimonate, dihydrogen antimonate, fluoride, boride, borate, hydrogen borate, perchlorate, chlorite, hypochlorite, perbromate, bromite, hypobromite, periodate, iodite, hypoiodite; and combinations thereof.

The metal-organic frameworks of the present invention optionally further comprise space-filling agents, adsorbed chemical species, guest species, and combinations thereof. In some variations of the invention, space-filling agents, adsorbed chemical species and guest species increase the surface area of the metal-organic framework. Suitable space-filling agents include, for example, a component selected from the group consisting of:

a. alkyl amines and their corresponding alkyl ammonium salts, containing linear, branched, or cyclic aliphatic groups, having from 1 to 20 carbon atoms;

b. aryl amines and their corresponding aryl ammonium salts having from 1 to 5 phenyl rings;

c. alkyl phosphonium salts, containing linear, branched, or cyclic aliphatic groups, having from 1 to 20 carbon atoms;

d. aryl phosphonium salts, having from 1 to 5 phenyl rings, e. alkyl organic acids and their corresponding salts, containing linear, branched, or cyclic aliphatic groups, having from 1 to 20 carbon atoms;

f. aryl organic acids and their corresponding salts, having from 1 to 5 phenyl rings;

g. aliphatic alcohols, containing linear, branched, or cyclic aliphatic groups, having from 1 to 20 carbon atoms;

h. aryl alcohols having from 1 to 5 phenyl rings;

i. inorganic anions from the group consisting of sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, O$^{2-}$, diphosphate, sulfide, hydrogen sulphate, selenide, selenate, hydrogen selenate, telluride, tellurate, hydrogen tellurate, nitride, phosphide, arsenide, arsenate, hydrogen arsenate, dihydrogen arsenate, antimonide, antimonate, hydrogen antimonate, dihydrogen antimonate, fluoride, boride, borate, hydrogen borate, perchlorate, chlorite, hypochlorite, perbromate, bromite, hypobromite, periodate, iodite, hypoiodite, and the corresponding acids and salts of said inorganic anions;

j. ammonia, carbon dioxide, methane, oxygen, argon, nitrogen, ethylene, hexane, benzene, toluene, xylene, chlorobenzene, nitrobenzene, naphthalene, thiophene, pyridine, acetone, 1,2-dichloroethane, methylenechloride, tetrahydrofuran, ethanolamine, triethylamine, trifluoromethylsulfonic acid, N,N-dimethyl formamide, N,N-diethyl formamide, dimethylsulfoxide, chloroform, bromoform, dibromomethane, iodoform, diiodomethane, halogenated organic solvents, N,N-dimethylacetamide, N,N-diethylacetamide, 1-methyl-2-pyrrolidinone, amide solvents, methylpyridine, dimethylpyridine, diethylethe, and mixtures thereof. Examples of adsorbed chemical species include ammonia, carbon dioxide, carbon monoxide, hydrogen, amines, methane, oxygen, argon, nitrogen, argon, organic dyes, polycyclic organic molecules, and combinations thereof. Finally, examples of guest species are organic molecules with a molecular weight less than 100 g/mol, organic molecules with a molecular weight less than 300 g/mol, organic molecules with a molecular weight less than 600 g/mol, organic molecules with a molecular weight greater than 600 g/mol, organic molecules containing at least one aromatic ring, polycyclic aromatic hydrocarbons, and metal complexes having formula M$_m$X$_n$ where M is metal ion, X is selected from the group consisting of a Group 14 through Group 17 anion, m is an integer from 1 to 10, and n is a number selected to charge balance the metal cluster so that the metal cluster has a predetermined electric charge, and combinations thereof. In some variations, adsorbed chemical species, guest species, and space-filling agents are introduced in the metal-organic frameworks by contacting the metal-organic frameworks with a pre-selected chemical species, guest species, or space-filling agent. In another variation of the present invention, the metal organic framework comprises an interpenetrating metal-organic framework that increases the surface area of the metal-organic framework.

In still another embodiment of the present invention, a method of forming the gas storage material set forth above is provided. The metal-organic framework is formed by combining a solution comprising a solvent and metal ions selected from the group consisting of Group 1 through 16 metals including actinides, and lanthanides, and combinations thereof with a multidentate linking ligand to form a precursor MOF. Suitable metal ions and multidentate lignands are described above. Examples of useful precursor metal-organic frameworks include, but are not limited to, the metal-organic frameworks disclosed in U.S. Pat. Nos. 5,648,508; 6,617,467; 6,624,318; 6,893,564; 6,929,679; 6,930,193; and 7,008,607; and in U.S. Pat. Appl. Nos. 20030078311; 20040225134; 20040249189; 20040265670; 20050004404; 20050154222; 20050192175; and 20060057057. The disclosures of each of these patents and patent applications are hereby incorporated by reference in their entireties. The metal-organic frameworks in these patents and patent applications that are useful as precursor metal-organic frameworks in the present invention are those frameworks that have a ligand or other chemical moiety that can be removed from a metal cluster thereby rendering that metal cluster reactive for adsorption of a chemical species. Moreover, such ligands include species such as water, solvent molecules contained within the metal clusters, and other chemical moieties having electron density available for attachment to the metal cluster and/or metal atoms or ions contained therein. Optionally, the solution also includes one or more counterions. Suitable counterions include, for example, sulfate, nitrate, halogen, phosphate, ammonium, and mixtures thereof. One or more ligands are removed from the precursor MOF to expose one or more open metal sites.

In one variation of the present embodiment, the one or more ligands are removed by heating the precursor MOF. Typically, in this variation, the precursor MOF is heated to a temperature from about 30° C. to about 300° C. In another variation, the one or more ligands are removed by exposing the precursor MOF to a vacuum. Typically, the vacuum is characterized by having a pressure less than $10^{-3}$ torr. In other variations, from about $10^{-5}$ torr to about 700 torr. In still another variation of the invention, the one or more ligands are removed by simultaneously heating the precursor MOF and by exposing the precursor MOF to a vacuum. In still another variation, the solution used in the method of the present invention may also include space-filling agents. Examples of suitable space-filling agents are set forth above. In a refinement of each of these variations, one or more ligands of the precursor MOF may be exchanged with another ligand or ligands that are more easily removed by subquent heating and/or exposure to a vacuum.

In another embodiment of the present invention, a gas storage system is provided. The gas storage system of this embodiment utilizes the gas storage material set forth above. As set forth above, gases that are storable by the present embodiment include any gaseous species having available electron density for attachment to the one or more sites for storing a gas in the metal-organic frameworks. Such gases include, but are not limited to, ammonia, argon, carbon dioxide, carbon monoxide, hydrogen, and combinations thereof. In a variation of this embodiment, the gas storage system is used as a gas separation system by removing and storing one or more target gases from a gaseous mixture. In one important variation, the gas storage system is used to store hydrogen and, therefore, is a hydrogen storage system. With reference to FIG. 1A, a schematic illustration of the gas storage system of the present embodiment is provided. Hydrogen storage system 10 includes container 12 which includes storage cavity 14.

Gas storage material 16 is positioned within container 12 filling at least a portion of gas storage cavity 14. Gas storage material 16 comprises a metal-organic framework as set forth above. Specifically, the metal-organic framework includes a plurality of metal clusters, and a plurality of charged multidentate linking ligands that connects adjacent metal clusters. The details of the linking ligands and the metal cluster are the same as that set forth above.

Still referring to FIG. 1A, gas storage system 10 further includes conduit 18 through which gas is introduced and removed. In another variation of the present invention, gas storage system 10 includes separate conduits for introducing gas (e.g., hydrogen) and for removing gas. Gas storage system 10 may also include valve 20 for closing off container 12 as needed. In one variation, after gas is introduced into container 12 and stored within gas storage material 16, valve 20 is closed off. Subsequently, when the gas is needed the stored gas is released by heating gas storage material 16 via heaters 22, 24. In another variation, the stored gas is removed under reduced pressure provided by pump 26 acting through conduit 28 and made available for subsequent use via outlet conduit 30.

Figure 1B:
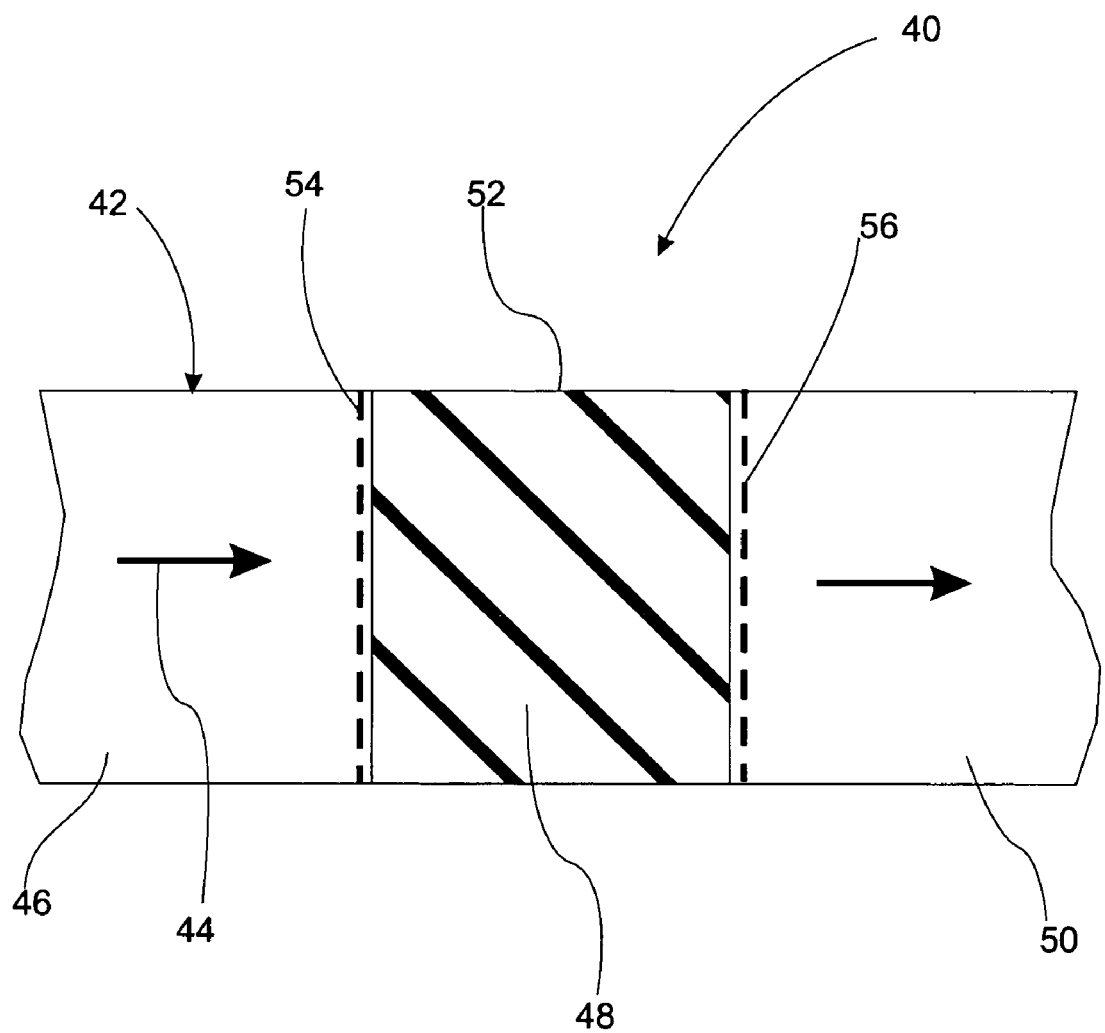
FIG. 1B is a schematic illustration of a variation of the present invention useful for separating a gaseous mixture.

With reference to FIG. 1B, a schematic illustration of a variation useful for separating a gaseous mixture is provided. Gas separation system 40 includes conduit 42 through which gaseous mixture 44 is introduced via inlet 46. Gaseous mixture 44 is directed through gas storage material 48 exiting through outlet 50. Gas storage material 48 is optionally confined to region 50 by barriers 52, 54 which are permeable to gas flow. As set forth above, target gases that can be separated form a gaseous mixture including any gaseous species having available electron density for attachment to the one or more sites for storing a gas in the metal-organic frameworks. Such target gases include, but are not limited to, ammonia, argon, carbon dioxide, carbon monoxide, hydrogen, and combinations thereof. In a refinement of the variation, the gas storage material removes carbon dioxide from a gaseous mixture and, in particular, a gaseous mixture emanating from industrial plants.

The following examples illustrate the various embodiments of the present invention. Those skilled in the art will recognize many variations that are within the spirit of the present invention and scope of the claims.

1. Hydrogen Adsorption

Figure 2:
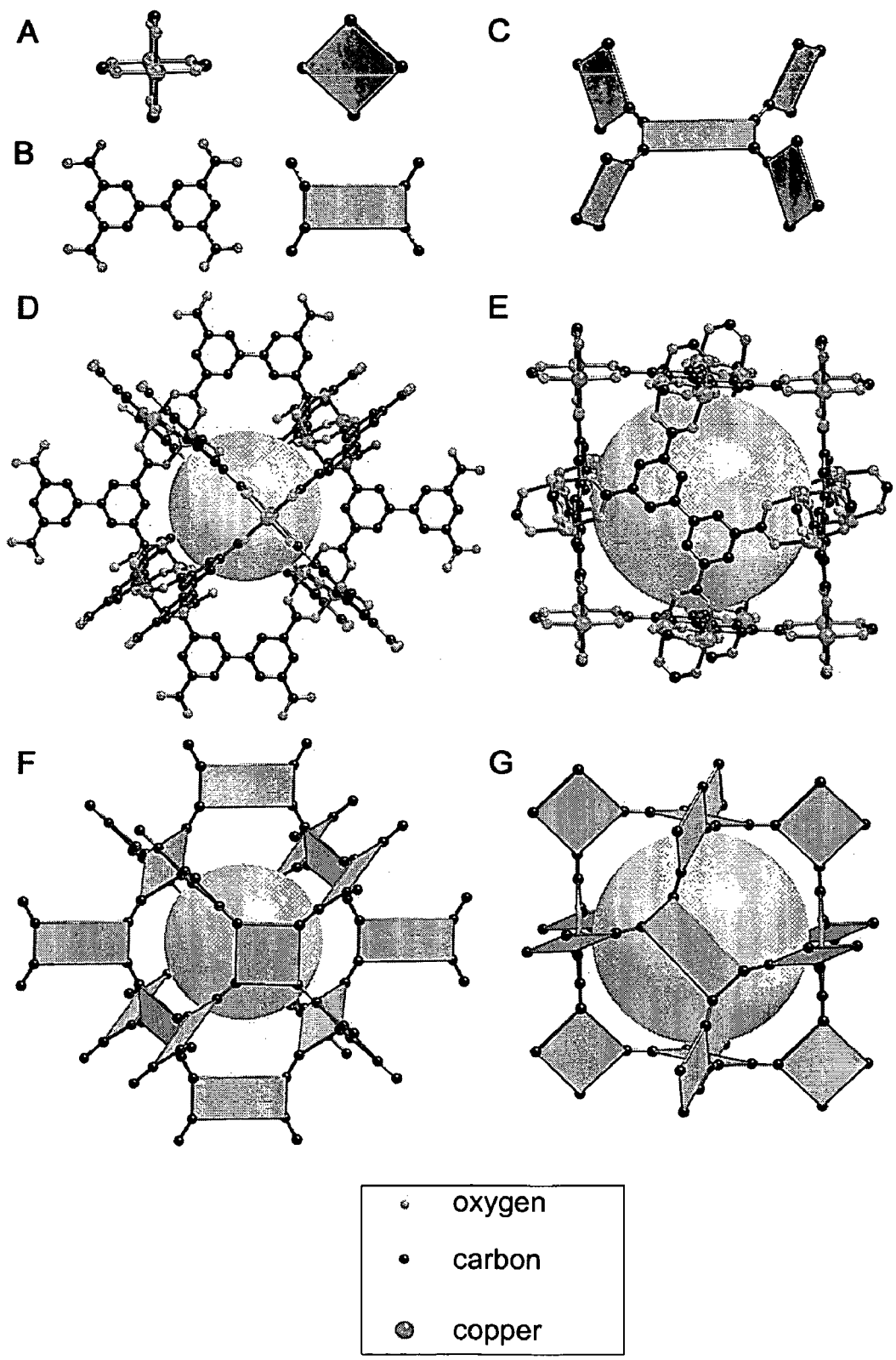
FIGS. 2A-G provide the single crystal x-ray structure of Cu2(BPTC)($H_2O)_2.(DMF)_3(H_2O)$ (named MOF-505) showing (A) $Cu_2(CO_2)_4$ units (quare SBUs) and (B) $BPTC^{4-}$ units (rectangular SBUs) that are (C) orthogonally joined. The overall 3-periodic crystal structure (D and E) has two different types of pores and an underlying NbO type net (F and G). (Cu, larger gray sphere; C, black sphere; O, smaller gray sphere). Hydrogen atoms, guest molecules and terminal solvent molecules have been omitted for clarity.

The $Cu_2(CO_2)_4$ unit is a square secondary building unit ("SBU") (FIG. 2A) that is defined by the carboxylate carbon atoms, and the $BPTC^{4-}$ unit is a rectangular SBU that is defined by its 3, 3', 5 and 5' carbon atoms (FIG. 2B). The carboxylate functionalities of the $BPTC^{4-}$ ligand are nearly planar (the dihedral angle between carboxylate and phenyl ring is 7.4°) with the biphenyl rings, thus when the square SBUs are linked to the biphenyl rings, they must be mutually orthogonal (FIG. 2C), an aspect that is the hallmark of the NbO topology. The crystal structure of MOF-505 (FIGS. 2D and 2E) clearly show that the link has predisposed the inorganic square SBUs at nearly 90° angles (94.4°) to the organic rectangular SBUs. This arrangement yields an overall 3-periodic network which has a bimodal distribution of pores. The first of these pores is defined by six inorganic SBUs (representing the faces of a cubic NbO subunit) with a spherical volume of 290 $Å^3$ and pore diameter of 8.30 Å (FIGS. 2D and 2G), while the second, and larger pore, is defined by six organic SBUs (again representing the faces of a cubic NbO subunit) and has a solvent accessible void of 540 $Å^3$ and pore diameter of 10.10 Å (FIGS. 2E and 2G). These roughly spherical pores are arranged in a rhombohedrally distorted CsCl-type fashion with the small pores surrounded by eight large pores, each of which is also surrounded by eight of the small pores. There are a total of six pores (three large and three small) per unit cell which are coupled through an interconnected porous network of 6.70 Å diameter apertures. This provides a total accessible free volume of 2,713 $Å^3$ (37.1%). Thermal gravimetric analysis (TGA) and powder X-ray diffraction (PXRD) patterns are used to evaluate framework stability under solvent exchange conditions. PXRD reveals the same pattern of intense diffraction lines in each of the simulated, as-synthesized, and acetone-exchanged materials. However, upon desolvation of the exchanged material, decreased diffraction intensities and broadened reflections are observed in the PXRD. This indicates some loss of long-range order but not necessarily loss of porosity as detailed below. A TGA study is undertaken to examine the thermal stability of MOF-505 and estimate the temperature of desolvation. An observed weight loss of 30.83% below 250° C. corresponds to the liberation of 2.5 acetone and 3 water molecules per $Cu_2BPTC$ formula unit (Calcd: 30.53%).

To evaluate whether the framework structure is maintained upon evacuation of the pores, gas sorption are obtained isotherms using a Cahn C-1000 microgravimetric balance to measure the change in mass of samples suspended within a glass enclosure under a chosen gas atmosphere. The as-synthesized MOF-505 crystalline sample is activated by immersion in acetone for 72 hr (3×50 ml/24 hr) to exchange the DMF guests. The resulting damp blue-green solid (617 mg) is loaded into the apparatus and evacuated (<$10^{-3}$ torr) in three stages while both weight loss and color changes are recorded: (I) 15 hours at room temperature (to 358 mg, 42.0% weight loss, light blue), (II) heating at 70° C. for 15 hours (to 325 mg, 5.3% weight loss, dark blue), and (III) a final dehydration at 120° C. for 12 hours (to 296 mg 4.7% weight loss, purple) resulting in the evacuated sample. Nitrogen and hydrogen isotherms are obtained for this sample at each of these activation stages (I-III) as described below. To ensure complete removal of all volatile contaminants from the system, the gas manifold is evacuated overnight and heated to 100° C. prior to the introduction of gas. The system is purged three times at room temperature with the gas to be studied (ultra-high purity grade, 99.999%) before cooling to 77° K with liquid nitrogen ("LN2"). The sample temperature is monitored by a thermocouple suspended in close proximity to the sample. Pressures are measured with two MKS Baratron 622A pressure transducers (10 and 1000 torr, accuracy ±0.25% of range). The gas is introduced incrementally and data points are recorded when no further change in mass is observed (<0.02 mg/10 min). An empirical buoyancy correction is applied to all data points based on the buoyancy experienced by standard aluminum foil weights within the pressure range of the gas at 77° K.

Figure 3:
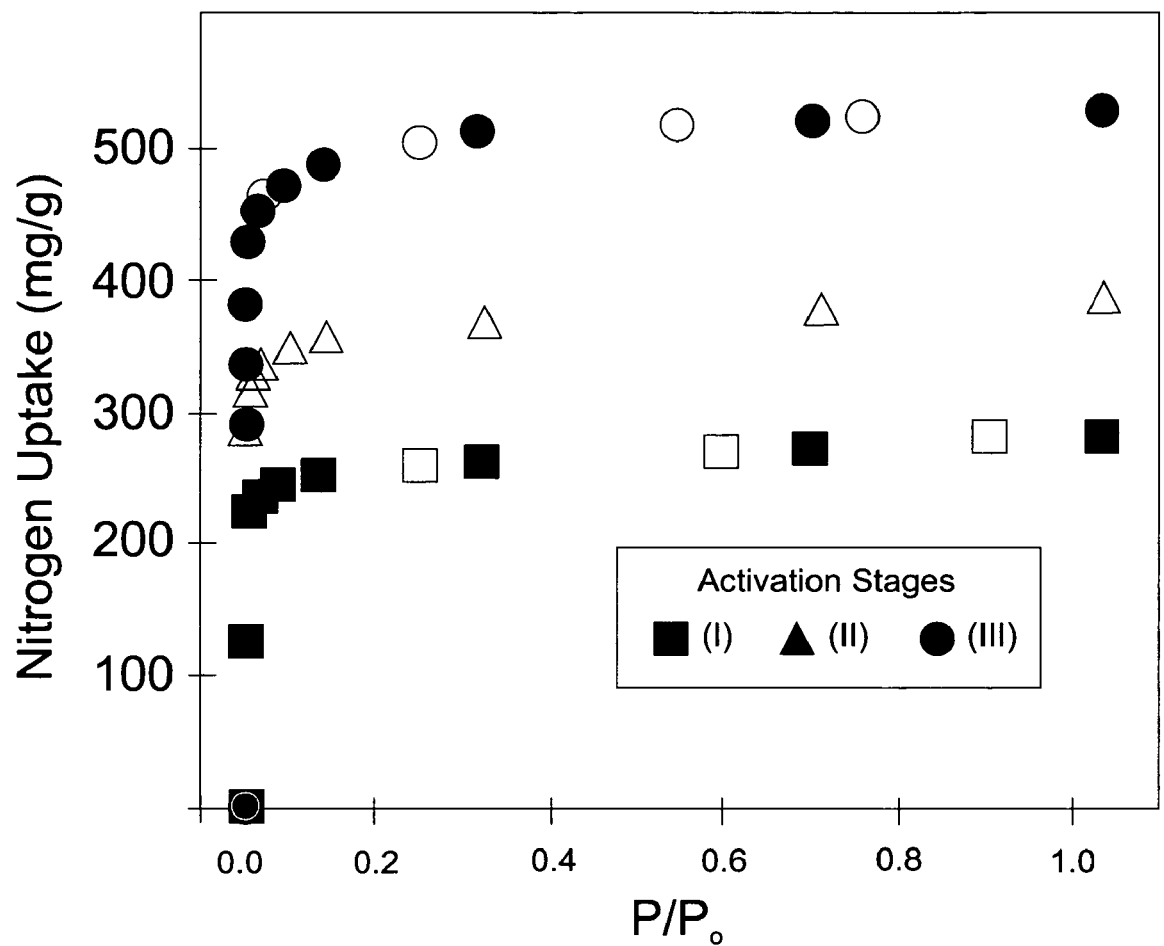
FIG. 3 provides $N_2$ isotherms for MOF-505 (77° K) after three different activation stages: stage I (25° C., squares), stage II (70° C., triangles) and stage III (120° C., circles)

Nitrogen sorption by this material clearly shows reversible Type I isotherms at each of the activation stages shown in FIG. 3, indicative of permanent microporosity and pore rigidity. At stage I (25° C.) an uptake of 278 mg/g is achieved, with an equivalent Langmuir surface area ($A_s$) of 967 m$^2$/g, and $K_{N2}$=0.193 for a 16.2 Å$^2$ molecular cross-section. Assuming liquid nitrogen density (0.808 g/cm$^3$) in the pores, extrapolation of the Dubinin-Radushkevich equation from the low pressure data points yield an available micropore volume ($V_p$) of 0.33 cm$^3$/g. Further evacuation of the pores (stage II) removes an additional 5.3% of guests, providing a 36% greater uptake (386 mg/g, As=1,343 m$^2$/g, $K_{N2}$=0.327, and $V_p$=0.45 cm$^3$/g) than that observed in the first stage. The fully activated material obtained after stage III shows a substantial increase in the sorption to give a final N$_2$ uptake of 526 mg/g (As=1,830 m2/g, KN2=0.362, and Vp=0.63 cm3/g). These data are summarized in Table 1.

without much higher pressures. The isotherms measured (0 to 750 torr) did not show saturation, however, the maximum uptake at 750 torr for each of the three hydrogen isotherms demonstrate similar capacity increases to those observed in the nitrogen isotherms, with the fully activated MOF-505 adsorbing an exceptional 2.47 wt % hydrogen at 750 torr and 77° K. This extraordinary hydrogen sorption capacity is unprecedented in previously reported MOF materials.

Removal of non-coordinated guests during activation has at least two positive effects on adsorption capacity: decrease of sample mass and increase of available micropore volume. However, removal of the water ligands (bound axially to the copper centers) has the same benefits, plus introduction of metal sites that are believed to enhance the hydrogen-framework interaction. The existence of such open metal sites in MOFs has been fully characterized by single crystal x-ray diffraction of MOF-11. If open metal sites are advantageous to higher uptake, then the last few weight percent lost during activation (stages II and III) would yield a disproportionately greater adsorption capacity when compared with the capacity at the initial stage of activation (stage I). Room temperature evacuation overnight (stage I) yields an initial hydrogen uptake of 14.10 mg/g (1.41 wt % H$_2$). The second activation step (stage II) removes an additional 5.3 wt % (partial dehydration) and increases the hydrogen uptake by 5.62 mg/g (19.72 mg/g, 1.97 wt % H$_2$). Further removal of 4.7 wt % (stage III, complete dehydration) increases the hydrogen uptake capacity by an additional 4.98 mg/g to 24.70 mg/g or 2.47 wt % H$_2$. Upon comparison the initial activation step (stage I, evacuation of bulk guests) showed an increase in hydrogen sorption of 0.34 mg/g per percent mass loss whereas the last two activation steps (stages II and III, dehydration with loss of six waters) showed a corresponding increase of 1.06 mg/g per percent mass loss during activation. Indeed, at stage I the H2 uptake (77 K) is 14.1 mg/g, while the fully activated material (stage III) containing open metal-sites displays an uptake nearly twice the magnitude (24.7 mg/g) despite only a 10% mass loss. The lack of any hysteresis in the isotherm illustrates that this physisorptive process is completely reversible, and that the presence of these open metal sites does not hamper the desorption process, nor do the 6.70 Å pore apertures significantly hinder adsorbate diffusion. Although there are slight curvatures in the Langmuir plots leading to some degree the uncertainty, some insight pertinent to this specific system can still be gained. The increasing $K_{H2}$

TABLE 1

Sorption Data for MOF-505

| Activation | | Uptake (mg/g) | | Langmuir Fit[a] | | | DR plot[d] | Δ wt % H$_2$ uptake/ |
|---|---|---|---|---|---|---|---|---|
| Stage | (° C.) | N$_2$ | H$_2$ | $A_s$ (m$^2$/g) | $K_{N2}$ (torr$^{-1}$)[b] | $K_{H2\ (torr)}^{-1}$ [c] | $V_{p\ (cm^3/g)}$ | Δ % mass loss |
| I | 25 | 278 | 14.1 | 967 | 0.193 | 0.0071 | 0.33 | 0.34 |
| II | 70 | 386 | 19.7 | 1,343 | 0.327 | 0.0070 | 0.45 | 1.06 |
| III | 120 | 526 | 24.7 | 1,830 | 0.362 | 0.0086 | 0.63 | 1.06 |

Figure 4:
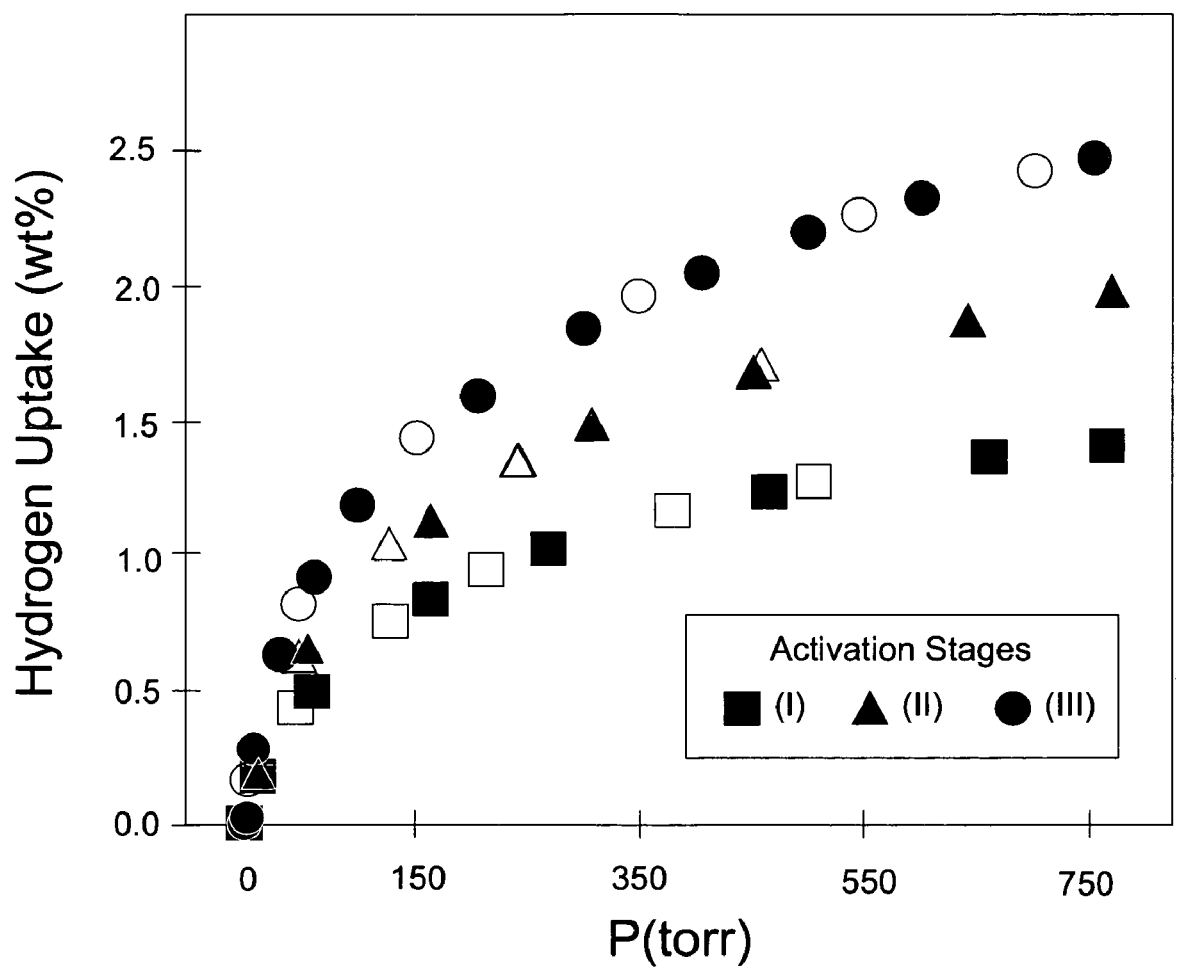
FIG. 4 provides $H_2$ isotherms for MOF-505 (77 K) after three different activation stages: stage I (25° C., squares), stage II (70° C., triangles) and stage III (120° C., circles).

[a]Calculated using a Langmuir fit of the data
[b]Calculated K values from N$_2$ data
[c]Calculated K values from H$_2$ data
[d]Pore volume ($V_p$) calculated through extrapolation of the Dubinin-Radushkevich (DR) equation The hydrogen isotherms of MOF-505 measured at 77° K at the same stages of activation are shown in FIG. 4. This temperature is well above the critical temperature (33° K.) for hydrogen, suggesting that condensation in the pores would be unlikely, and complete saturation would not be achieved values reveal a trend toward increasing hydrogen affinity of the fully dehydrated framework relative to the partially evacuated material. Based on these data the presence of these open-metal sites is shown to enhance the MOF-505 hydrogen adsorption capacity.

Each stage of the activation is also accompanied by distinct changes in sample appearance. As-synthesized MOF-505 is blue-green and the first stage activation changes this to light blue; further activation deepens the blue color while the final activation step yields a deep purple colored material. An activated sample exposed to ambient air for 36 hours showed a dramatic color change from purple back to blue-green with the subsequent TGA showing a loss of 18.7 wt % below 250° C., corresponding to loss of six waters per $Cu_2BPTC$ formula unit (Calcd: 19.3%). Undoubtedly, two of these water molecules are axially coordinated to the paddlewheels while the remaining four may be located in the equatorial quadrants defined by adjacent carboxylate groups of every paddlewheel.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A gas storage material comprising a metal-organic framework, the metal-organic framework comprising:
   a plurality of metal clusters, each metal cluster comprising one or more metal ions and at least open metal site; and
   a plurality of charged multidentate linking ligands that connect adjacent metal clusters, wherein the metal-organic framework includes one or more sites for storing a gas, the gas comprising available electron density for attachment to the one or more sites for storing gas.

2. The gas storage material of claim 1 wherein the metal-organic framework further comprises a plurality of pores for gas adsorption.

3. The gas storage material of claim 1 wherein the plurality of pores have a multimodal size distribution.

4. The gas storage material of claim 1 wherein the gas comprises a component selected from the group consisting of ammonia, argon, carbon dioxide, carbon monoxide, hydrogen, and combinations thereof.

5. The gas storage material of claim 1 wherein each metal cluster comprises 2 or more metal ions and each ligand of the plurality of multidentate ligand includes 2 or more carboxylates.

6. The gas storage material of claim 1 wherein the metal ion selected from the group consisting of Group 1 through 16 metals of the IUPAC Periodic Table of the Elements including actinides, and lanthanides, and combinations thereof.

7. The gas storage material of claim 1 wherein the metal ion selected from the group consisting of $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^+$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, $Bi^+$, and combinations thereof.

8. The gas storage material of claim 1 wherein the metal cluster has formula $M_mX_n$ where M is metal ion, X is selected from the group consisting of Group 14 through Group 17 anion, m is an integer from 1 to 10, and n is a number selected to charge balance the metal cluster so that the metal cluster has a predetermined electric charge.

9. The gas storage material of claim 8 wherein X is selected from the group consisting of O, N, and S.

10. The gas storage material of claim 8 wherein M is selected from the group consisting of $Mg^{2+}$, $Ca^{2+}$, $Sr^{2+}$, $Ba^{2+}$, $V^{2+}$, $V^{3+}$, $V^{4+}$, $V^{5+}$, $Mn^{2+}$, $Re^{2+}$, $Fe^{2+}$, $Fe^{3+}$, $Ru^{3+}$, $Ru^{2+}$, $Os^{2+}$, $Co^{2+}$, $Rh^{2+}$, $Ir^{2+}$, $Ni^{2+}$, $Pd^{2+}$, $Pt^{2+}$, $Cu^{2+}$, $Zn^{2+}$, $Cd^{2+}$, $Hg^{2+}$, $Si^{2+}$, $Ge^{2+}$, $Sn^{2+}$, and $Pb^{2+}$.

11. The gas storage material of claim 7 wherein the metal-organic framework further comprises a non-linking ligand.

12. The gas storage material of claim 7 wherein the non-linking ligand is selected from the group consisting of $O^{2-}$, sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, sulfide, hydrogen sulphate, selenide, selenate, hydrogen selenate, telluride, tellurate, hydrogen tellurate, nitride, phosphide, arsenide, arsenate, hydrogen arsenate, dihydrogen arsenate, antimonide, antimonate, hydrogen antimonate, dihydrogen antimonate, fluoride, boride, borate, hydrogen borate, perchlorate, chlorite, hypochlorite, perbromate, bromite, hypobromite, periodate, iodite, hypoiodite; and mixtures thereof.

13. The gas storage material of claim 1 wherein the metal-organic framework further comprising a guest species.

14. The gas storage material of claim 13 wherein the guest species increase the surface area of the metal-organic framework.

15. The gas storage material of claim 13 wherein the guest species is selected from the group consisting of organic molecules with a molecular weight less than 100 g/mol, organic molecules with a molecular weight less than 300 g/mol, organic molecules with a molecular weight less than 600 g/mol, organic molecules with a molecular weight greater than 600 g/mol, organic molecules containing at least one aromatic ring, polycyclic aromatic hydrocarbons, and metal complexes having formula $M_mX_n$ where M is metal ion, X is selected from the group consisting of Group 14 through Group 17 anion, m is an integer from 1 to 10, and n is a number selected to charge balance the metal cluster so that the metal cluster has a predetermined electric charge, and combinations thereof.

16. The gas storage material of claim 1 wherein the metal-organic framework further comprises an interpenetrating metal-organic framework that increases the surface area of the metal-organic framework.

17. The gas storage material of claim 1 wherein the multidentate linking ligand has 6 or more atoms that are incorporated in aromatic rings or non-aromatic rings.

18. The gas storage material of claim 1 wherein the multidentate linking ligand has 12 or more atoms that are incorporated in aromatic rings or non-aromatic rings.

19. The gas storage material of claim 1 wherein the one or more multidentate linking ligands comprise a ligand selected from the group consisting of ligands having formulae 1 through 21:

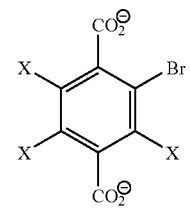

1

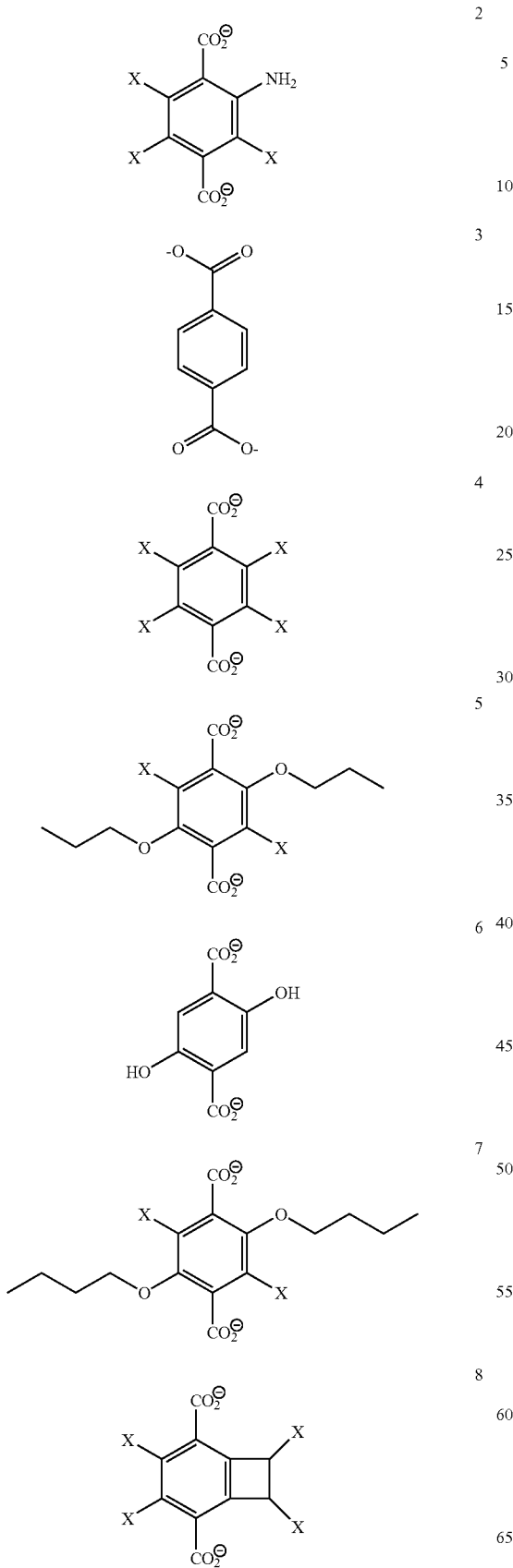
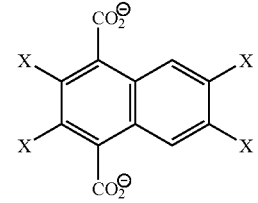
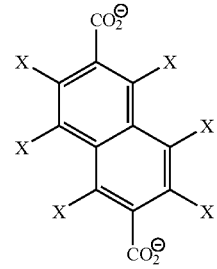
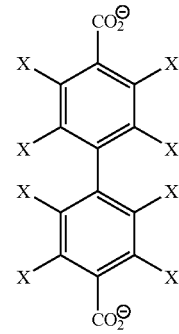
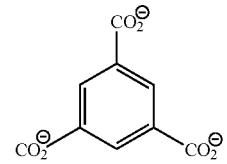
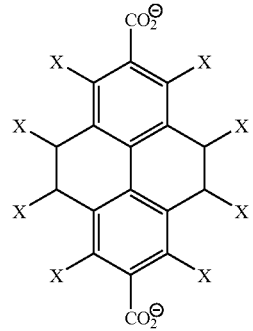

-continued
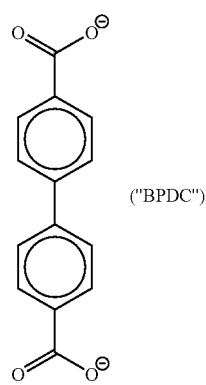
("BPDC")
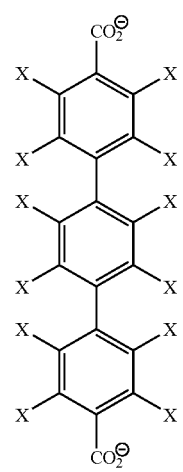
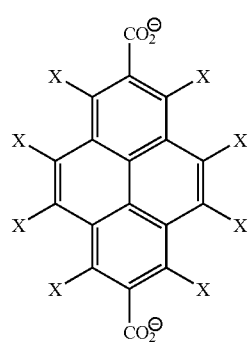
-continued
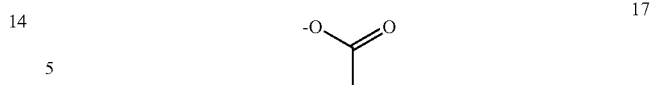
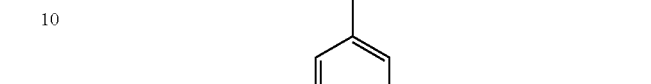
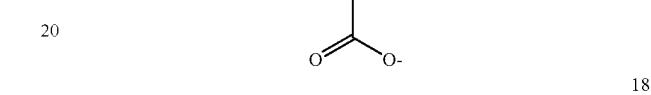
("BTB")
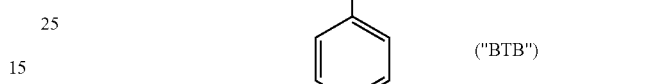
("HPDC")
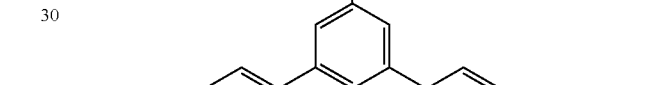
(BPTC)
wherein X is hydrogen, —NHR, —N(R)$_2$, halides, C$_{1-10}$ alkyl, C$_{6-18}$ aryl, or C$_{6-18}$ aralky, —NH$_2$, alkenyl, alkynyl, —Oalkyl, —NH(aryl), cycloalkyl, cycloalkenyl, cycloalkynyl, —(CO)R, —(SO$_2$)R, —(CO$_2$)R —SH, —S(alkyl), —SO$_3$H, —SO$^{3-}$M$^+$, —COOH, —COO$^-$M+, —PO$_3$H$_2$, —PO$_3$H$^-$M$^+$, —PO$_3{}^{2-}$M$^{2+}$, or —PO$_3{}^{2-}$M$^{2+}$, —NO$_2$, —CO₂H, silyl derivatives; borane derivatives; and ferrocenes and other metallocenes; M is a metal atom, and R is $C_{1-10}$ alkyl.

20. A hydrogen storage material comprising a metal-organic framework, the metal-organic framework comprising:
   a plurality of metal clusters, each metal cluster comprising one or more metal ions and at least one open metal site; and
   a plurality of charged multidentate linking ligands that connect adjacent metal clusters, wherein the metal-organic framework includes one or more sites for storing molecular hydrogen.

21. The hydrogen storage material of claim 20 wherein the metal-organic framework further comprises a plurality of pores for hydrogen adsorption.

22. The hydrogen storage material of claim 20 wherein the plurality of pores have a multimodal size distribution.

23. The hydrogen storage material of claim 20 wherein the metal-organic framework comprises copper ion and

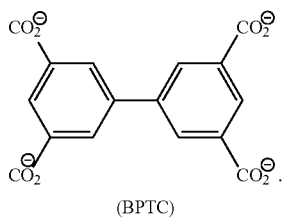

(BPTC)

24. The hydrogen storage material of claim 20 wherein each metal cluster comprises 2 or more metal ions and each ligand of the plurality of multidentate ligand includes 2 or more carboxylates.

25. The hydrogen storage material of claim 20 wherein the metal ion selected from the group consisting of Group 1 through 16 metals of the IUPAC Periodic Table of the Elements including actinides, and lanthanides, and combinations thereof.

26. The hydrogen storage material of claim 20 wherein the metal ion selected from the group consisting of $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, $Bi^+$, and combinations thereof.

27. The hydrogen storage material of claim 20 wherein the metal cluster has formula $M_mX_n$ where M is metal ion, X is selected from the group consisting of a Group 14 through Group 17 anion, m is an integer from 1 to 10, and n is a number selected to charge balance the metal cluster so that the metal cluster has a predetermined electric charge.

28. The hydrogen storage material of claim 27 wherein X is selected from the group consisting of O, N, and S.

29. The hydrogen storage material of claim 27 wherein M is selected from the group consisting of $Mg^{2+}$, $Ca^{2+}$, $Sr^{2+}$, $Ba^{2+}$, $V^{2+}$, $V^{3+}$, $V^{4+}$, $V^{5+}$, $Mn^{2+}$, $Re^{2+}$, $Fe^2$, $Fe^{3+}$, $Ru^{3+}$, $Ru^{2+}$, $Os^{2+}$, $Co^{2+}$, $Rh^{2+}$, $Ir^{2+}$, $Ni^{2+}$, $Pd^{2+}$, $Pt^{2+}$, $Cu^{2+}$, $Zn^{2+}$, $Cd^{2+}$, $Hg^{2+}$, $Si^{2+}$, $Ge^{2+}$, $Sn^{2+}$, and $Pb^{2+}$.

30. The hydrogen storage material of claim 1 wherein the metal-organic framework further comprises a non-linking ligand.

31. The hydrogen storage material of claim 30 wherein the non-linking ligand is selected from the group consisting of $O^{2-}$, sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, sulfide, hydrogen sulphate, selenide, selenate, hydrogen selenate, telluride, tellurate, hydrogen tellurate, nitride, phosphide, arsenide, arsenate, hydrogen arsenate, dihydrogen arsenate, antimonide, antimonate, hydrogen antimonate, dihydrogen antimonate, fluoride, boride, borate, hydrogen borate, perchlorate, chlorite, hypochlorite, perbromate, bromite, hypobromite, periodate, iodite, hypoiodite; and mixtures thereof.

32. The hydrogen storage material of claim 20 wherein the metal-organic framework further comprising a guest species.

33. The hydrogen storage material of claim 32 wherein the guest species increases the surface area of the metal-organic framework.

34. The hydrogen storage material of claim 32 wherein the guest species is selected from the group consisting of organic molecules with a molecular weight less than 100 g/mol, organic molecules with a molecular weight less than 300 g/mol, organic molecules with a molecular weight less than 600 g/mol, organic molecules with a molecular weight greater than 600 g/mol, organic molecules containing at least one aromatic ring, polycyclic aromatic hydrocarbons, and metal complexes having formula $M_mX_n$ where M is metal ion, X is selected from the group consisting of a Group 14 through Group 17 anion, m is an integer from 1 to 10, and n is a number selected to charge balance the metal cluster so that the metal cluster has a predetermined electric charge, and combinations thereof.

35. The hydrogen storage material of claim 20 wherein the metal-organic framework further comprises an interpenetrating metal-organic framework that increases the surface area of the metal-organic framework.

36. The hydrogen storage material of claim 20 wherein the multidentate linking ligand has 6 or more atoms that are incorporated in aromatic rings or non-aromatic rings.

37. The hydrogen storage material of claim 20 wherein the multidentate linking ligand has 12 or more atoms that are incorporated in aromatic rings or non-aromatic rings.

38. The hydrogen storage material of claim 20 wherein the one or more multidentate linking ligands comprise a ligand selected from the group consisting of ligands having formulae 1 through 20:

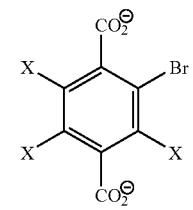

1

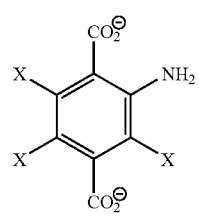

2

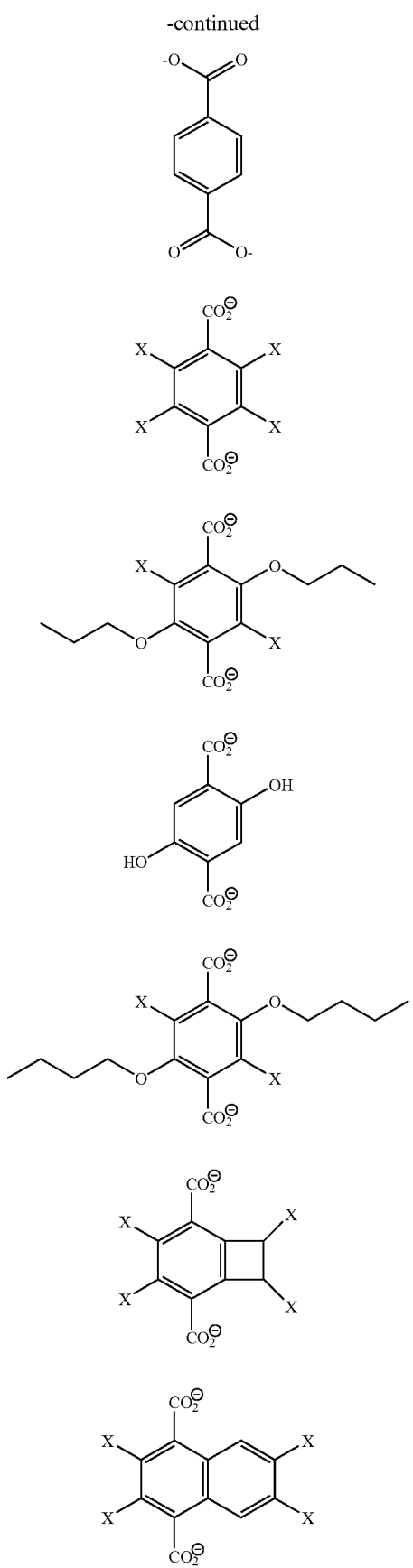
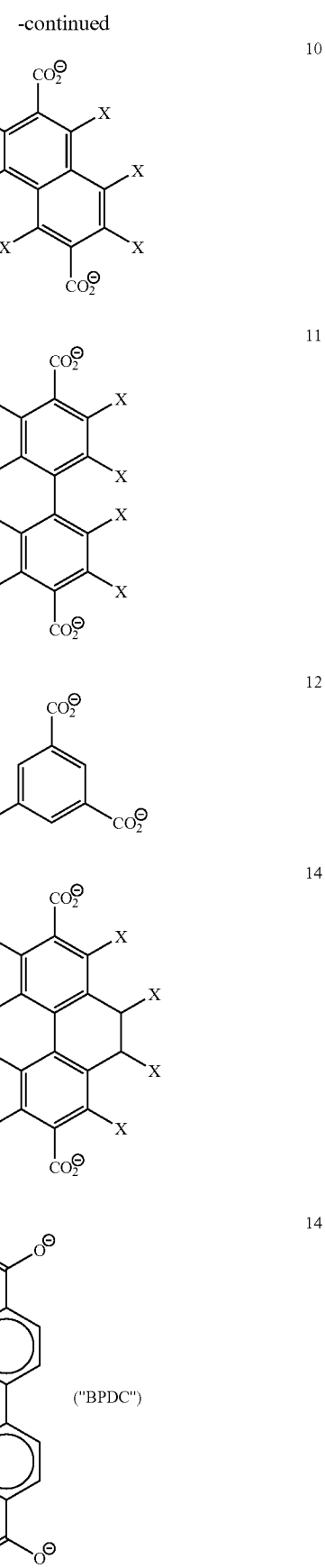

-continued

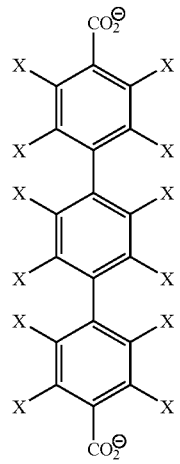
15

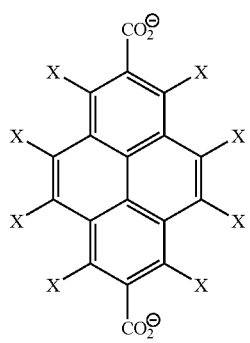
16

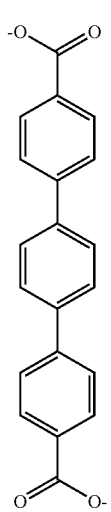
17

-continued

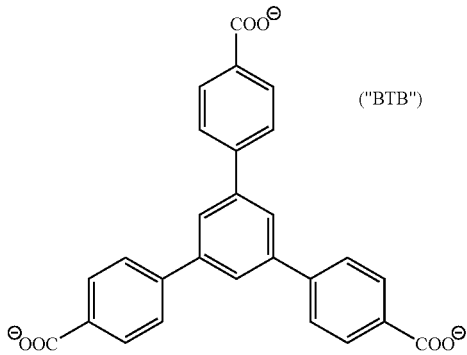
("BTB") 18

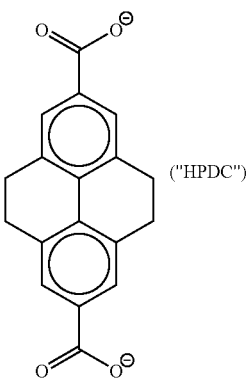
("HPDC") 19

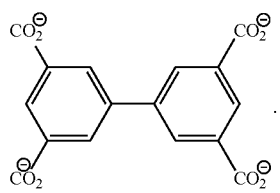
(BPTC) 20

39. A hydrogen storage system comprising:
a container having a storage cavity;
a hydrogen storage material positioned within and filling at least a portion of the hydrogen storage container, the hydrogen storage material comprising a metal-organic framework, the metal-organic framework including:
a plurality of metal clusters, each metal cluster comprising one or more metal ions; and
a plurality of charged multidentate linking ligands that connect adjacent metal clusters, wherein the metal-organic framework includes at least one open metal site and having a sufficient number of accessible sites for atomic or molecular adsorption of molecular hydrogen.

40. The hydrogen storage system of claim 39 wherein the metal-organic framework further comprises a plurality of pores for hydrogen adsorption.

41. The hydrogen storage system of claim 39 wherein the plurality of pores have a multimodal size distribution.

42. A method of forming a metal-organic framework (MOF), the method comprising:

a) combining a solution comprising a solvent and metal ions selected from the group consisting of Group 1 through 16 metals including actinides, and lanthanides, and combinations thereof with a multidentate linking ligand to form a percursor MOF; and b) removing one or more ligands from the precursor MOF to expose one or more open metal sites.

43. The method of claim 42 wherein the one or more ligands removed in step b) are removed by heating the precursor MOF.

44. The method of claim 42 wherein the precursor MOF is heated to a temperature from about 30° C. to about 300° C.

45. The method of claim 42 wherein the one or more ligands removed in step b) are removed by exposing the precursor MOF to a vacuum.

46. The method of claim 42 wherein the vacuum is characterized by having a pressure from about $10^{-5}$ torr to about 700 torr.

47. The method of claim 42 wherein the one or more ligands removed in step b) are removed by simultaneously heating the precursor MOF and by exposing the precursor MOF to a vacuum.

48. A gas storage material comprising a metal-organic framework, the metal-organic framework comprising:

a plurality of metal clusters, each metal cluster comprising one or more metal ions and at least open accessible metal site; and a plurality of charged multidentate linking ligands that connects adjacent metal clusters, wherein the metal-organic framework includes one or more sites for storing a gas, the gas comprising available electron density for attachment to the one or more sites for storing gas.

* * * * *

UNITED STATES PATENT AND TRADEMARK OFFICE
CERTIFICATE OF CORRECTION

PATENT NO. : 7,662,746 B2
APPLICATION NO. : 11/400478
DATED : February 16, 2010
INVENTOR(S) : Omar M. Yaghi and Banglin Chen It is certified that error appears in the above-identified patent and that said Letters Patent is hereby corrected as shown below:

At Column 1, line 10, before the "BACKGROUND OF THE INVENTION" section, the following section should be inserted:

--STATEMENT REGARDING FEDERALLY SPONSORED RESEARCH OR DEVELOPMENT

The invention was made with Government support under NSF grant DMR0242630. The Government has certain rights to the invention.--

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,662,746 B2
APPLICATION NO. : 11/400478
DATED : February 16, 2010
INVENTOR(S) : Yaghi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 842 days.

Signed and Sealed this

Twenty-eighth Day of December, 2010

David J. Kappos
*Director of the United States Patent and Trademark Office*